(12) United States Patent
Zhu et al.

(10) Patent No.: US 12,520,213 B2
(45) Date of Patent: Jan. 6, 2026

(54) METHODS AND DEVICES FOR ENHANCING INTEGRATED ACCESS BACKHAUL NETWORKS FOR NEW RADIO

(71) Applicant: ZTE Corporation, Shenzhen (CN)

(72) Inventors: Hao Zhu, Shenzhen (CN); Lin Chen, Shenzhen (CN); Ying Huang, Shenzhen (CN); Liping Wang, Shenzhen (CN); Xueying Diao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 296 days.

(21) Appl. No.: 18/137,529

(22) Filed: Apr. 21, 2023

(65) Prior Publication Data

US 2023/0262557 A1 Aug. 17, 2023

Related U.S. Application Data

(63) Continuation of application No. PCT/CN2020/122700, filed on Oct. 22, 2020.

(51) Int. Cl.
*H04W 36/08* (2009.01)
(52) U.S. Cl.
CPC .................. *H04W 36/087* (2023.05)
(58) Field of Classification Search
CPC ............... H04W 36/087; H04W 36/08; H04W 84/042; H04W 24/04; H04W 36/305;
(Continued)

(56) References Cited

U.S. PATENT DOCUMENTS

2016/0249259 A1 8/2016 Park et al.
2019/0394084 A1 12/2019 Tsai et al.
(Continued)

FOREIGN PATENT DOCUMENTS

CN 109936830 A 6/2019
CN 110649997 A 1/2020
(Continued)

OTHER PUBLICATIONS

International Search Report and Written Opinion regarding PCT/CN2020/122700 dated Jul. 13, 2021, 7 pages.
(Continued)

*Primary Examiner* — Dhaval V Patel
(74) *Attorney, Agent, or Firm* — Crowell & Moring LLP

(57) ABSTRACT

The present disclosure describes methods, systems, and devices for releasing resources for a recovery integrated access backhaul-node (IAB-node) and/or avoiding, from performing radio resource control (RRC) reestablishment procedure, at least one descendant device of a recovery integrated access backhaul-node (IAB-node) from an initial IAB-donor-central unit (CU) to a new IAB-donor-CU. One method includes sending, by the new IAB-donor-CU to the initial IAB-donor-CU, a user equipment (UE) context release information to indicate the resources to be released; and upon receiving the UE context release information, releasing, by the initial IAB-donor-CU, the resources indicated by the UE context release information. Another method includes sending, by the new IAB-donor-CU to the initial IAB-donor-CU, a message. Another method includes sending, by the initial IAB-donor-CU to the at least one descendant device via the new IAB-donor-CU or new IAB-donor-DU, a radio resource control (RRC) message.

12 Claims, 19 Drawing Sheets

(58) Field of Classification Search
CPC ............. H04W 24/08; H04W 36/0055; H04W 36/00837; H04W 36/38; H04W 72/231; H04W 76/18; H04W 76/19; H04W 84/047

See application file for complete search history.

(56) References Cited

U.S. PATENT DOCUMENTS

| | | | |
|---|---|---|---|
| 2020/0084655 | A1 | 3/2020 | Fiorani et al. |
| 2020/0120725 | A1 | 4/2020 | Mildh et al. |
| 2021/0105622 | A1 | 4/2021 | Rajadurai |
| 2021/0377930 | A1 | 12/2021 | Liu et al. |
| 2022/0151006 | A1* | 5/2022 | Muhammad .......... H04W 76/20 |
| 2022/0312311 | A1* | 9/2022 | Vangala ................ H04W 48/20 |
| 2022/0338099 | A1* | 10/2022 | Zhu ....................... H04W 60/06 |
| 2022/0361067 | A1* | 11/2022 | Koskinen ........... H04B 7/15528 |
| 2023/0189096 | A1 | 6/2023 | Barac et al. |
| 2023/0276322 | A1 | 8/2023 | Liu et al. |
| 2023/0337311 | A1* | 10/2023 | Teyeb ................... H04W 76/19 |

FOREIGN PATENT DOCUMENTS

| | | |
|---|---|---|
| CN | 110830979 A | 2/2020 |
| CN | 111182581 A | 5/2020 |
| CN | 111294836 A | 6/2020 |
| CN | 111567088 A | 8/2020 |
| CN | 111586709 A | 8/2020 |
| KR | 10-2018-0063090 A | 6/2018 |
| WO | WO 2015/115964 A1 | 8/2015 |
| WO | WO 2019162489 A1 | 8/2019 |
| WO | WO 2019/246446 A1 | 12/2019 |
| WO | WO 2020/076228 A2 | 4/2020 |
| WO | WO 2020/076228 A3 | 4/2020 |
| WO | WO 2020/166912 A1 | 8/2020 |

OTHER PUBLICATIONS

Huawei, "(TP for NR_IAB BL CR for TS 38.401): Intra IAB donor-CU topology adaptation procedure," *3GPP TSG-RAN W63 Meeting #105bis Fifi-195468*, Chongqing, China, Oct. 4, 2019.

Chinese-language Chinese Office Action issued in Chinese Application No. 2020801064004 dated May 15, 2024 (8 pages).

Huawei, "Discussion on HARQ for NTN" *3GPP TSG RAN WG1 Meeting #98bis R1-1910065*, Chongqing, China, Oct. 14-20, 2019.

Extended European Search Report EP 20 95 8148 dated Oct. 17, 2023.

International Search Report and Written Opinion regarding PCT/CN2020/122701 dated Jun. 3, 2021, 6 pages.

Extended European Search Report regarding EP 20 95 8149 dated Jun. 22, 2023, 13 pages.

Huawei, "Inter-CU RLF recovery Procedure," 3GPP Draft; R3-205293, 3rd Generation Partnership Project (3GPP), Mobile Competence Centre; 650, Route Des Lucioles; F-06921 Sophia-Antipolis Cedex, France, vol. RAN WG3, No. Online; Aug. 17, 2020-Aug. 28, 2020, Aug. 7, 2020, 4 pages. Retrieved from the Internet: http://ftp.3gpp.org/tsg_ran/WG3_li/TSGR3_109-e/Docs/R3-205293.zip_R3 205293Inter-CU RLF recovery procedure.doc.

"3rd Generation Partnership Project; Technical Specification Group Radio Access Network; NG-RAN; Xn application protocol (XnAP) (Release 16)," 3GPP Draft; 38423-630, 3rd Generation Partnership Project (3GPP), MobilE Competence Centre; 650, Route Des Lucioles, F-06921 Sophia-Antipolis Cedex, France, Oct. 2, 2020, XP052300376, 111 pages. Retrieved from the Internet: https://ftp.3gpp.org/3guinternal/3GPP_ultimate_versions_to_be_transposed/sentToDpc/38423-g30.zip 38423-930.doc Ericsson (Moderator), "Summary of Offline Discussion on Inter-donor Migration," 3GPP Draft, R3-205466, 3rd Generation Partnership Project (3GPP), Mobile Competence Centre, 650, Route Des Lucioles, F-06921 Sophia-Antipolis Cedex, France vol. RAN WG3, No. Online; Aug. 17, 2020-Aug. 27, 2020, Sep. 2, 2020, XP051928192, 17 pages. Retrieved from the Internet: https://ftp.3gpp.org/tsg_ran/WG3_lu/TSGR3_109-e/Docs/R3-205466.zip R3-205466 #6Inter-donor migration SoD_PhaseIConclusion.doc Nokia et al, "IAB Integration," 3GPP Draft; R3-190499 IAB Start-UP, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 25, 2019-Mar. 2019, Feb. 16, 2019, XP051604439, 5 pages. Retrieved from the Internet: http://www.3gpp.org/ftp/tsg%5Fran/WG3%5Fiu/TSGR3%5Fl03/Docs/R3%2Dl90499%2Ezip.

Anonymous, "3rd Generation Partnership Project; Technical Specification Group Radio Access Network; NR; Study on Integrated Access and Backhaul; (Release 16)", 3GPP Standard; Technical Report; 3GPP TR38.874, 3rd Generation Partnership Project(3GPP), Mobile Competence Centre, 650, Route Des Lucioles, F-06921 Sophia-Antipolis Cedex, France, No. V16.0.0, Jan. 10, 2019, 451 pages.

European Patent Office First Communication (Office Action) regarding 20 958 149.5 dated Sep. 26, 2024, 11 pages.

Indian Office Action regarding 202317009649 dated Jan. 23, 2024, 6 pages.

Vietnamese-language Office Action with English translation issued in Application No. 1-2023-01649 dated Aug. 11, 2025, (4 pages).

Non-Final Office Action issued in related U.S. Appl. No. 18/113,157 mailed Jun. 6, 2025, 42 pages.

Korean-language Office Action issued in Korean Application No. 10-2023-7017511 dated Jul. 29, 2025, with English translation (15 pages).

Final Office Action issued in related U.S. Appl. No. 18/113,157 dated Oct. 31, 2025, (39 pages).

* cited by examiner

1000 sending, by the IAB-donor-CU to the IAB-node distributed unit (IAB-DU), a first message to initiate a first F1 procedure
1010 receiving, by the IAB-donor-CU from the IAB-DU, a second message to indicate whether the first F1 procedure is successful
1020

1200 sending, by the new IAB-donor-CU to the initial IAB-donor-CU, an IAB context retrieve related request message
1210

receiving, by the new IAB-donor-CU from the initial IAB-donor-CU, an IAB context retrieve related response
1220

FIG. 12

1300 sending, by the new IAB-donor-CU to the initial IAB-donor-CU, a user equipment (UE) context release information to indicate the resources to be released
1310

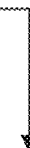

upon receiving the UE context release information, releasing, by the initial IAB-donor-CU, the resources for an IAB-node indicated in the UE context release information
1320

FIG. 13

1500 sending, by the new IAB-donor-CU to the initial IAB-donor-CU, a message
1510 sending, by the initial IAB-donor-CU to the new IAB-donor-CU, a handover request message for requesting a handover procedure to at least one descendant device
1520 responding, by the new IAB-donor-CU to, a handover request acknowledge message
1530 sending, by the initial IAB-donor-CU to the at least one descendant device via the new IAB-donor-CU or new IAB-donor-DU, a radio resource control (RRC) message
1540 sending, by the at least one descendant device to the new IAB-donor-CU, a response to the RRC message, indicating that a RRC connection of the at least one descendant device has been handover to the new IAB-donor-CU
1550

FIG. 15

1600 sending, by the initial IAB-donor-CU to the at least one descendant device via the new IAB-donor-CU or new IAB-donor-DU, a radio resource control (RRC) message
1610

> sending, by the initial IAB-donor-CU to the new IAB-donor-CU, a handover request message for requesting a handover procedure to at least one descendant device, wherein the at least one descendant device performs a conditional handover (CHO) to the new IAB-donor-CU based on the RRC message and a trigger condition
> 
> 1810

> sending, by the at least one descendant device to the new IAB-donor-CU, a response to a RRC message, indicating that a RRC connection of the at least one descendant device has been handover to the new IAB-donor-CU
> 
> 1820

> sending, by a first IAB-node to a child device of the first IAB-node, an indication indicating a recovery event
> 
> 1910

FIG. 19

2000 sending, by the new IAB-donor-CU to a child device of the recovery IAB-node, a
radio resource control (RRC) message

2010 responding, by the child device of the recovery IAB-node, a RRC complete message

METHODS AND DEVICES FOR ENHANCING INTEGRATED ACCESS BACKHAUL NETWORKS FOR NEW RADIO

CROSS-REFERENCE TO RELATED APPLICATION

This application is a continuation application of PCT International Patent Application No. PCT/CN2020/122700, filed with the China National Intellectual Property Administration, PRC on Oct. 22, 2020, which is herein incorporated by reference in its entirety.

TECHNICAL FIELD

The present disclosure is directed generally to wireless communications. Particularly, the present disclosure relates to methods and devices for enhancing integrated access backhaul (IAB) for new radio (NR).

BACKGROUND

Wireless communication technologies are moving the world toward an increasingly connected and networked society. Compared with long term evolution (LTE), the fifth generation (5G) new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency.

The 5G NR may include an integrated access backhaul (IAB) implementation. The IAB implementation may include one or more IAB-donors and multiple connecting IAB-nodes. Currently, there are problems and/or issues associated with improving the mobility robustness for recovering IAB nodes, particularly in the circumstances where a radio link failure (RLF) is detected.

The present disclosure describes various embodiments for recovering an IAB-node from an initial IAB-donor to a new IAB-donor, which may address at least some of problems/issues associated with the existing system to improve the performance of the wireless communication.

SUMMARY

This document relates to methods, systems, and devices for wireless communication, and more specifically, for enhancing integrated access backhaul (IAB) for new radio (NR).

In one embodiment, the present disclosure describes a method for wireless communication. The method includes retrieving, by a new integrated access backhaul-donor-central unit (IAB-donor-CU) from an initial IAB-donor-CU, context information; and configuring, by the new IAB-donor-CU, a connection with a recovery IAB-node.

In another embodiment, the present disclosure describes a method for wireless communication. The method includes sending, by a new IAB-donor-CU to an initial IAB-donor-CU, a request for retrieving user equipment (UE) context; and receiving, by the new IAB-donor-CU from the initial IAB-donor-CU, a response for retrieving UE context.

In another embodiment, the present disclosure describes a method for wireless communication. The method includes recovering a recovery integrated access backhaul-node (IAB-node) for new radio (NR) from an initial IAB-donor-central unit (CU) to a new IAB-donor-CU by: receiving, by the new IAB-donor-CU from the recovery IAB-node distributed unit (IAB-DU), a first message to initiate a first F1 procedure; sending, by the new IAB-donor-CU to the recovery IAB-DU, a second message to indicate whether the first F1 procedure is successful; and wherein the new IAB-donor-CU comprises a gNB-CU and the recovery IAB-DU comprises a gNB-DU.

In another embodiment, the present disclosure describes a method for wireless communication. The method includes configuring a F1 connection between an integrated access backhaul-node (IAB-node) and an IAB-donor-CU by: sending, by the IAB-donor-CU to the IAB-node distributed unit (IAB-DU), a first message to initiate a first F1 procedure; receiving, by the IAB-donor-CU from the IAB-DU, a second message to indicate whether the first F1 procedure is successful; and wherein the IAB-donor-CU comprises a gNB-CU and the IAB-DU comprises a gNB-DU.

In another embodiment, the present disclosure describes a method for wireless communication. The method includes recovering a recovery integrated access backhaul-node (IAB-node) for new radio (NR) from an initial IAB-donor-central unit (CU) to a new IAB-donor-CU by: sending, by the new IAB-donor-CU to the initial IAB-donor-CU, an IAB context retrieve related request message; and receiving, by the new IAB-donor-CU from the initial IAB-donor-CU, an IAB context retrieve related response.

In another embodiment, the present disclosure describes a method for wireless communication. The method includes sending, by a new integrated access backhaul-donor-central unit (IAB-donor-CU) to an initial IAB-donor-CU, user equipment (UE) context release information to indicate resources to be released; and upon receiving the UE context release information, releasing, by the initial IAB-donor-CU, the resources for an IAB-node indicated in the UE context release information.

In another embodiment, the present disclosure describes a method for wireless communication. The method includes sending, by a new IAB-donor-CU to an initial IAB-donor-CU, a message, wherein the message comprises a new NG-RAN node UE XnAP ID reference, an old NG-RAN node UE XnAP ID reference, and a first indication.

In another embodiment, the present disclosure describes a method for wireless communication. The method includes sending, by an initial IAB-donor-CU to at least one descendant device via a new IAB-donor-CU or new IAB-donor-DU, a radio resource control (RRC) message, wherein the initial IAB-donor-CU comprises a first IAB-donor-CU serving the recovery IAB-node, and the new IAB-donor-CU comprises a second IAB-donor-CU.

In another embodiment, the present disclosure describes a method for wireless communication. The method includes configuring at least one descendant device of a recovery integrated access backhaul-node (IAB-node) from an initial IAB-donor-central unit (CU) to a new IAB-donor-CU by: sending, by the initial IAB-donor-CU to the new IAB-donor-CU, a handover request message for requesting a handover procedure to at least one descendant device, wherein the at least one descendant device performs a conditional handover (CHO) to the new IAB-donor-CU based on the RRC message and a trigger condition.

In another embodiment, the present disclosure describes a method for wireless communication. The method includes configuring at least one descendant device of a recovery integrated access backhaul-node (IAB-node) from an initial IAB-donor-central unit (CU) to a new IAB-donor-CU by: sending, by a first IAB-node to a child device of the first IAB-node, an indication indicating a recovery event.

In another embodiment, the present disclosure describes a method for wireless communication. The method includes configuring at least one descendant device of a recovery integrated access backhaul-node (IAB-node) from an initial IAB-donor-central unit (CU) to a new IAB-donor-CU by: sending, by the new IAB-donor-CU to a child device of the recovery IAB-node, a radio resource control (RRC) message; and responding, by the child device of the recovery IAB-node, a RRC complete message.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 12 shows a flow diagram of a method for wireless communication.

FIG. 13 shows a flow diagram of a method for wireless communication.

FIG. 15 shows a flow diagram of a method for wireless communication.

FIG. 16 shows a flow diagram of a method for wireless communication.

FIG. 18 shows a flow diagram of a method for wireless communication.

FIG. 19 shows a flow diagram of a method for wireless communication.

FIG. 20 shows a flow diagram of a method for wireless communication.

DETAILED DESCRIPTION

Figure 1A:
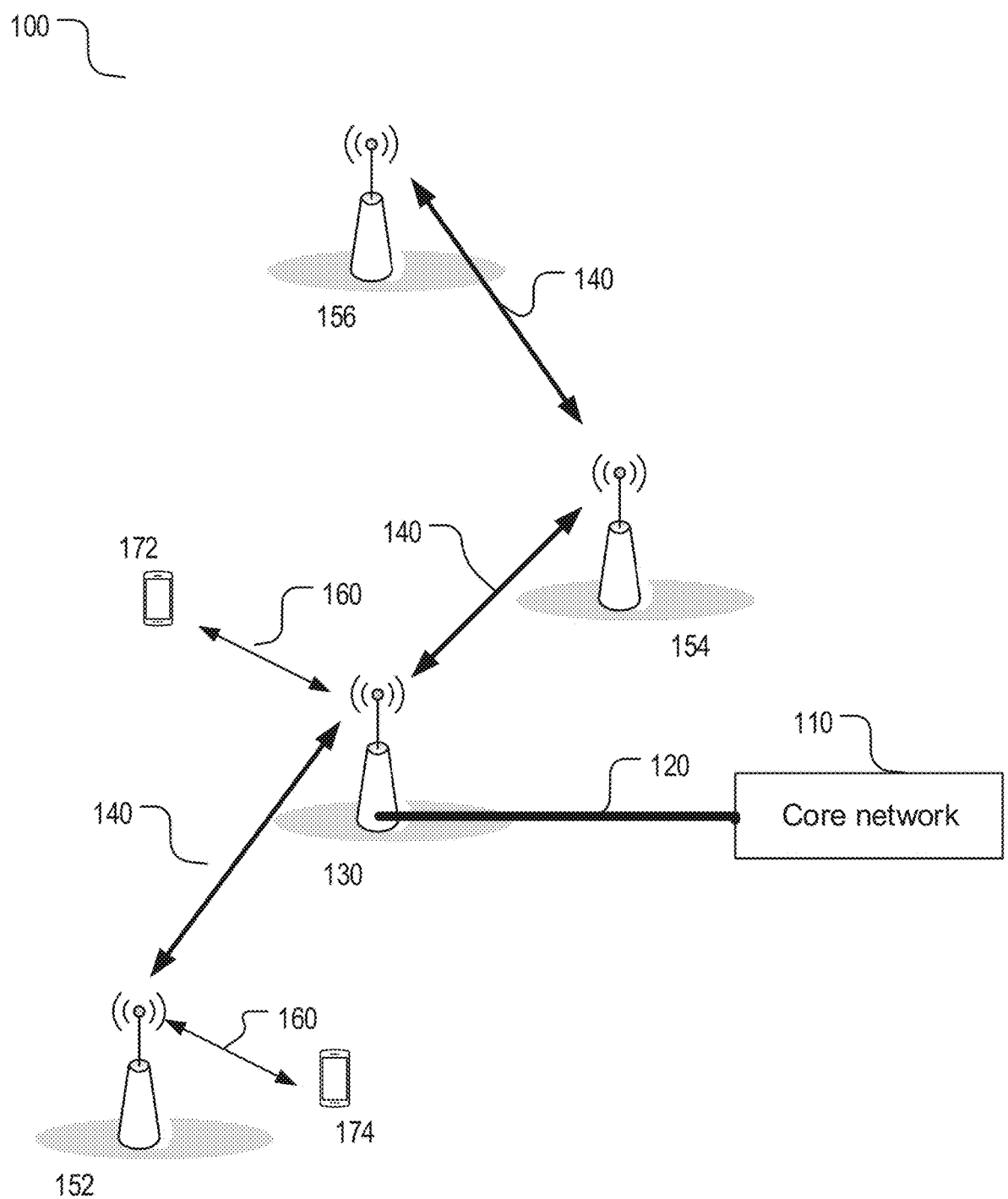
FIG. 1A shows an example of a wireless communication system include an integrated access backhaul (IAB) system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for enhancing integrated access backhaul (IAB) for new radio (NR).

Next generation (NG), or 5th generation (5G), wireless communication may provide a range of capabilities from downloading with fast speeds to support real-time low-latency communication. Compared with long-term evolution (LTE), the 5G new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency. The 5G NR may include a development of an integrated access backhaul (IAB) implementation. The IAB implementation may include one or more IAB-donors and multiple connecting IAB-nodes. The IAB implementation may communicate between one or more IAB-donors and one or more IAB-nodes via wireless backhaul and relay links. The IAB implementation may provide a flexible NR cell configuration and increase cell density without increasing the density of IAB-donors.

An IAB system may include one or more IAB-donors and one or more IAB-nodes, which collectively provide wireless connection service to one or more user equipment (UEs) (e.g., smartphones). The IAB-donors and IAB-nodes may be wireless network base stations including a NG radio access network (NG-RAN) base station, which may include a nodeB (NB, e.g., a gNB) in a mobile telecommunications context. The IAB-donor may provide access backhaul to one or more connecting child IAB-nodes, and may connect to a core network via a wired communication. In one implementation, the core network may include a 5G core network (5GC). In another implementation, the wired communication may include a fiber transport communication. The IAB-node may include wireless access link and wireless backhaul link. The wireless access link may be used for communication between a UE and the IAB-node. The wireless backhaul link may be used for communication between the IAB-node and the IAB-donor, and/or communications between one IAB-node with another IAB-node. Thus, the IAB-node does not need a wired communication network for data backhaul. In some implementations, the IAB-node does not include a wired communication network for data backhaul, so that IAB-node are more flexible and easier to implement, mitigating the burden of implementing wired communication network. The access link and backhaul link may use transmission bands with same frequency (known as in-band relay), or use transmission bands with different frequency (known as out-band relay).

Figure 1B:
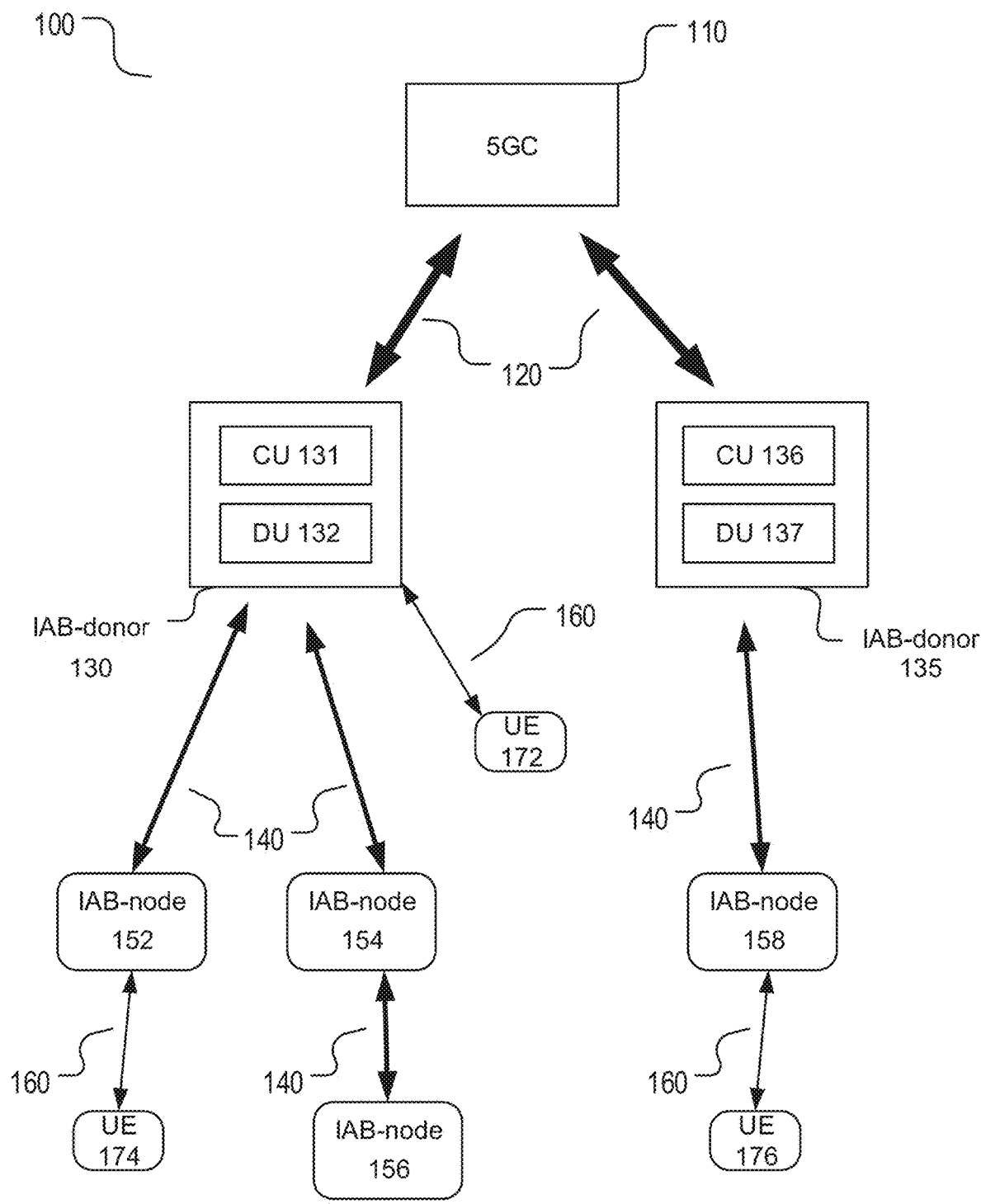
FIG. 1B shows another example of an architecture of an IAB system.

Referring to FIGS. 1A and 1B, the IAB-donor 130 may provide access backhaul 140 to one or more connecting child IAB-nodes (152 and 154). The IAB-donor 130 may connect to a core network 110 via a wired communication 120. In one implementation, the core network 110 may include a 5G core network (5GC). In another implementation, the wired communication 120 may include a fiber transport communication. In another implementation, between the two connecting IAB-nodes (e.g., 154 and 156), the IAB-node 154 may be known as a parent IAB-node, and/or the IAB-node 156 may be known as a child IAB-node.

An IAB-donor may provide a wireless connection to one or more user equipment (UE). The UE may be a mobile device, for example, a smart phone or a mobile communication module disposed in a vehicle. For example, the IAB-donor 130 may provide a wireless connection 160 to a UE 172.

Similarly and without limitation, a child or parent IAB-node may provide a wireless connection to one or more UEs. For example, the IAB-node 152 may provide a wireless connection 160 to a UE 174.

Similarly and without limitation, a child IAB-node may provide access backhaul to one or more connecting grandchild IAB-nodes. For example, the IAB-node 154 may provide access backhaul 140 to an IAB-node 156. Similarly and without limitation, the grandchild IAB-nodes may also provide access backhaul to one or more connecting great-grandchild IAB-nodes and/or provide wireless connection to one or more UEs. In another implementation, the IAB-node 154 may be a parent IAB-node of the IAB-node 156.

Referring to FIG. 1B, the IAB system 100 may include more than one IAB-donors (130 and 135). Each of the IAB-donors may connect to a core network (e.g., 5GC) 110 via a wired communication 120. In one implementation, the IAB-donor 135 may provide access backhaul 140 to one or more connecting child IAB-nodes 158; and the IAB-node 158 may provide a wireless connection 160 to one or more UE 176.

In another implementation, the IAB-donor 130 may include at least one central unit (CU) (for example, an IAB-donor-CU 131) and at least one distributed unit (DU) (for example, an IAB-donor-DU 132). The at least one IAB-donor-DU 132 may connect to the at least one IAB-donor-CU 131, and then the at least one IAB-donor-CU 131 may connect to the 5GC 110.

Similarly in another implementation, the IAB-donor 135 may include at least one CU (for example, an TAB-donor-CU 136) and at least one DU (for example, an IAB-donor-DU 137). The at least one TAB-donor-DU 137 may connect to the at least one IAB-donor-CU 136, and then the at least one TAB-donor-CU 136 may connect to the 5GC 110.

When an IAB-node detects a radio link failure (RLF), which means that the backhaul (BH) link between the IAB-node and its initial parent IAB-node occurs a failure, the IAB-node may try to recover to a new parent IAB-node. There is numerous problems/issues of how an IAB-node recovers to a new parent node served by a new TAB-donor-CU.

The present disclosure describes embodiments of methods and devices of enhancing IAB for NR. To improve the efficiency of wireless communication, the topology and flexibility of the architecture has been greatly improved. Specifically, the existing and/or improved architecture may support inter-CU recovery of IAB nodes and multipath transmission of IAB nodes. This complex and flexible architecture may bring advantages to IAB network performance, and may need higher requirements for network control. The present disclosure may address one or more problems associated with inter-CU recovery of IAB-node, for example but not limited to, how to ensure high efficient transmission during the IAB recovery.

Figure 1C:
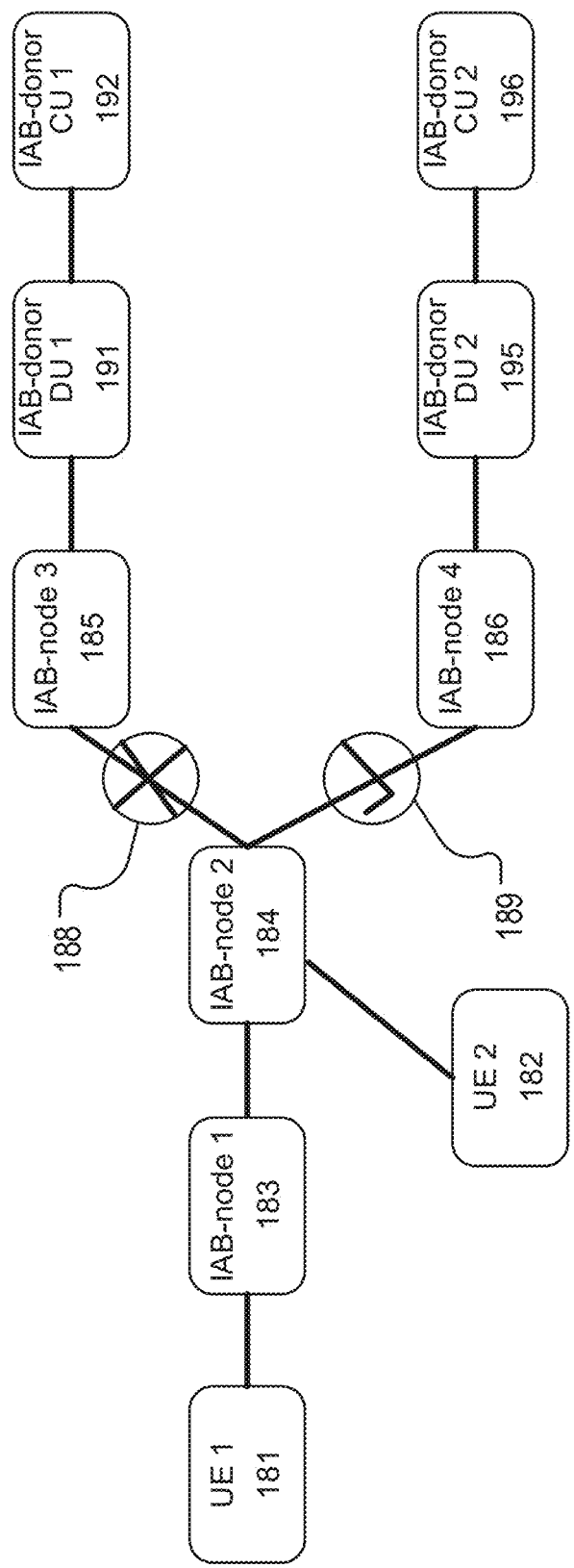
FIG. 1C shows an example of an embodiment for wireless communication when a radio link failure occurs.

Referring to FIG. 1C, initially, an IAB-node 2 184 connects to its parent IAB-node, i.e., an IAB-node 3 185. The IAB-node 3 185 connects to an initial IAB-donor DU 1 191, which connects to an initial IAB-donor CU 1 192. The IAB-node 2 184 has one or more child or descendent device. The one or more child or descendent device includes an IAB-node 1 183 connecting to an UE1 181. The one or more child or descendent device may also include an UE 2 182.

When the IAB-node 2 184 detects a RLF 188, the IAB-node 2 184 may try to recover to a new parent IAB-node, i.e., an IAB-node 4 186. The IAB-node 4 186 may connect to an IAB-donor DU 2 195 connecting to an IAB-donor CU 2 196. The present disclosure describes various embodiments for recovering the IAB-node 2 184, addressing at least some of the problems/issues discussed above. In some embodiments, the recovering procedure 189 may include a RRC re-establishment procedure to a new parent IAB-node. Some embodiments in the present disclosure may provide solutions to problems related to backhaul (BH) RLF recovery, especially for inter-CU BH RLF recovery.

Figure 2:
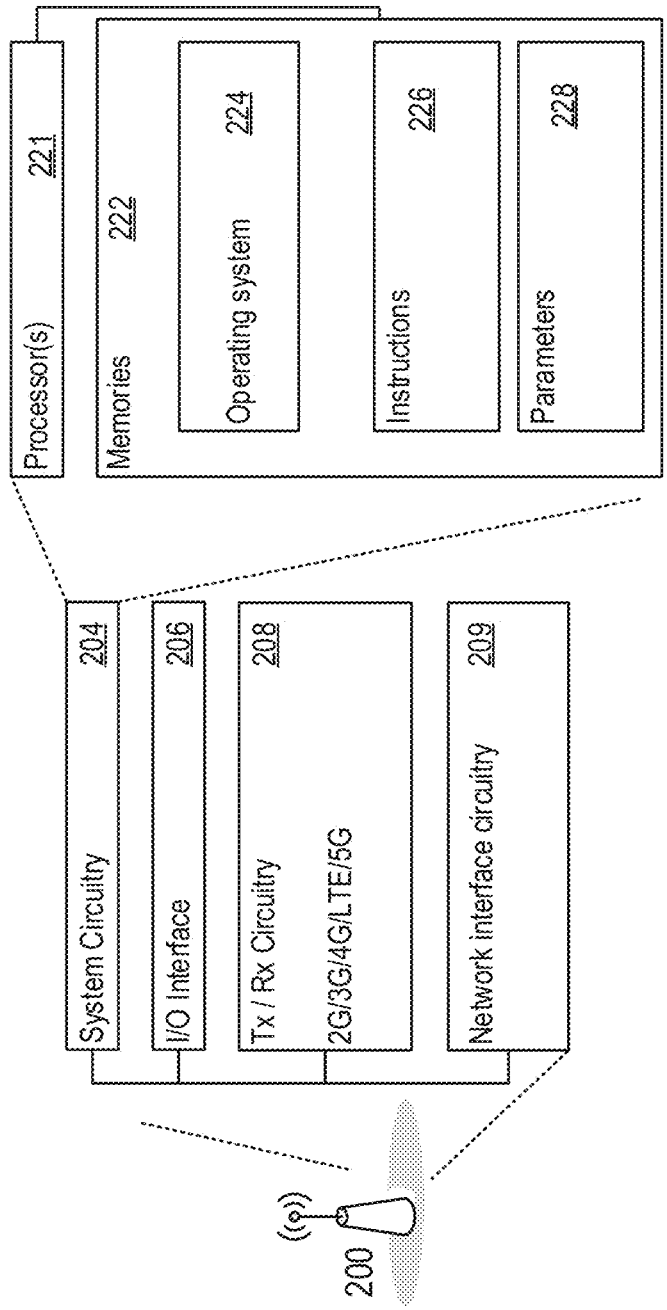
FIG. 2 shows an example of an IAB-donor or IAB-node.

FIG. 2 shows an exemplary wireless communication base station 200. The wireless communication base station 200 may be an exemplary implementation of at least one of the IAB-donors (130 and 135) and/or the IAB-nodes (152, 154, 156, and 158) in FIGS. 1A and 1B. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
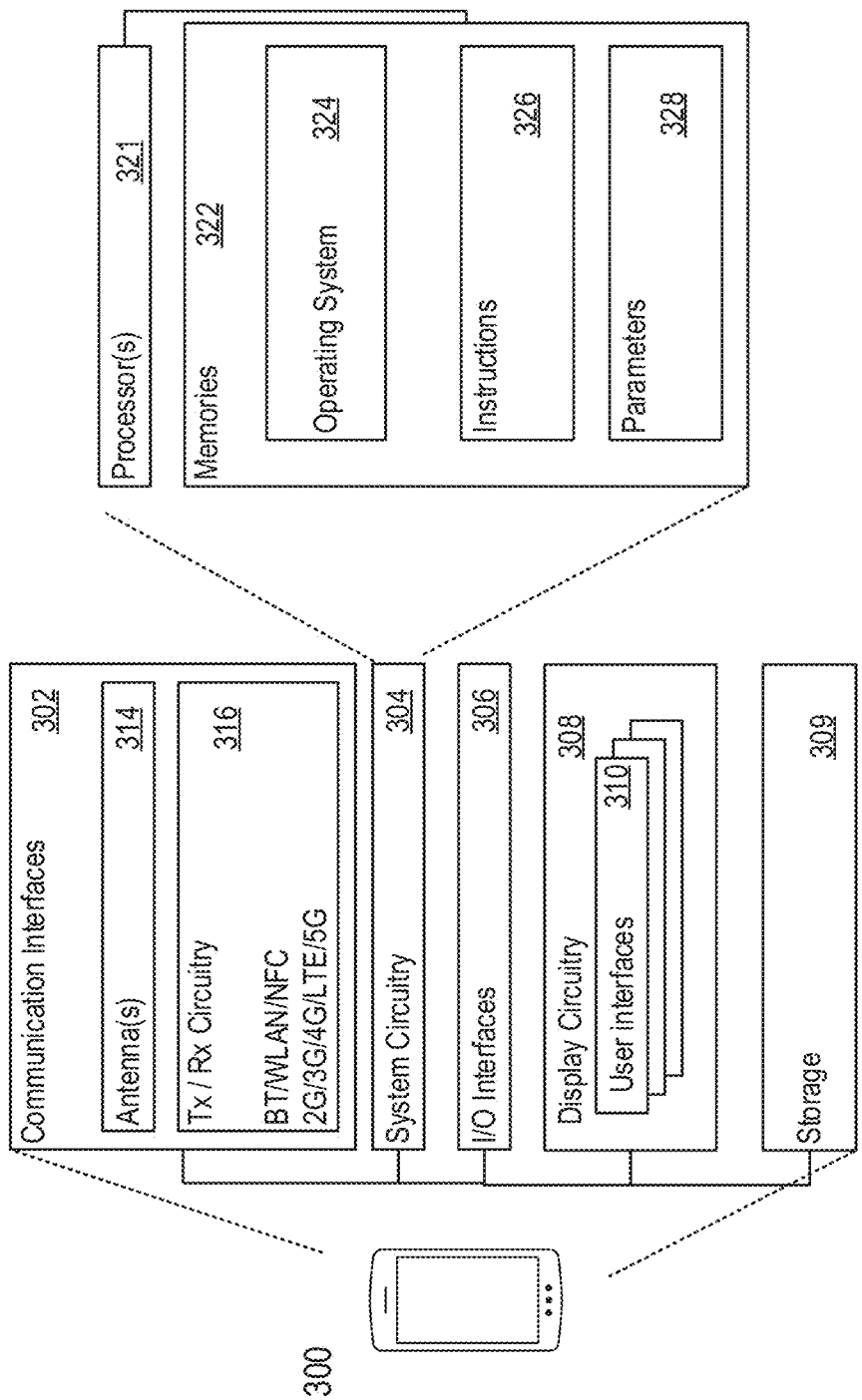
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may be an exemplary implementation of at least one of the UEs (172, 174, and 176) in FIGS. 1A and 1B. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for enhancing integrated access backhaul (IAB) for new radio (NR), which may be implemented, partly or totally, on one or more wireless network base station and/or one or more user equipment described above in FIGS. 2 and 3. IAB-node is made of two parts: IAB-MT and IAB-DU. In the present disclosure, an IAB-donor-CU may be called as a NG-RAN node, and an IAB-DU may be called as a gNB-DU.

Figure 4:
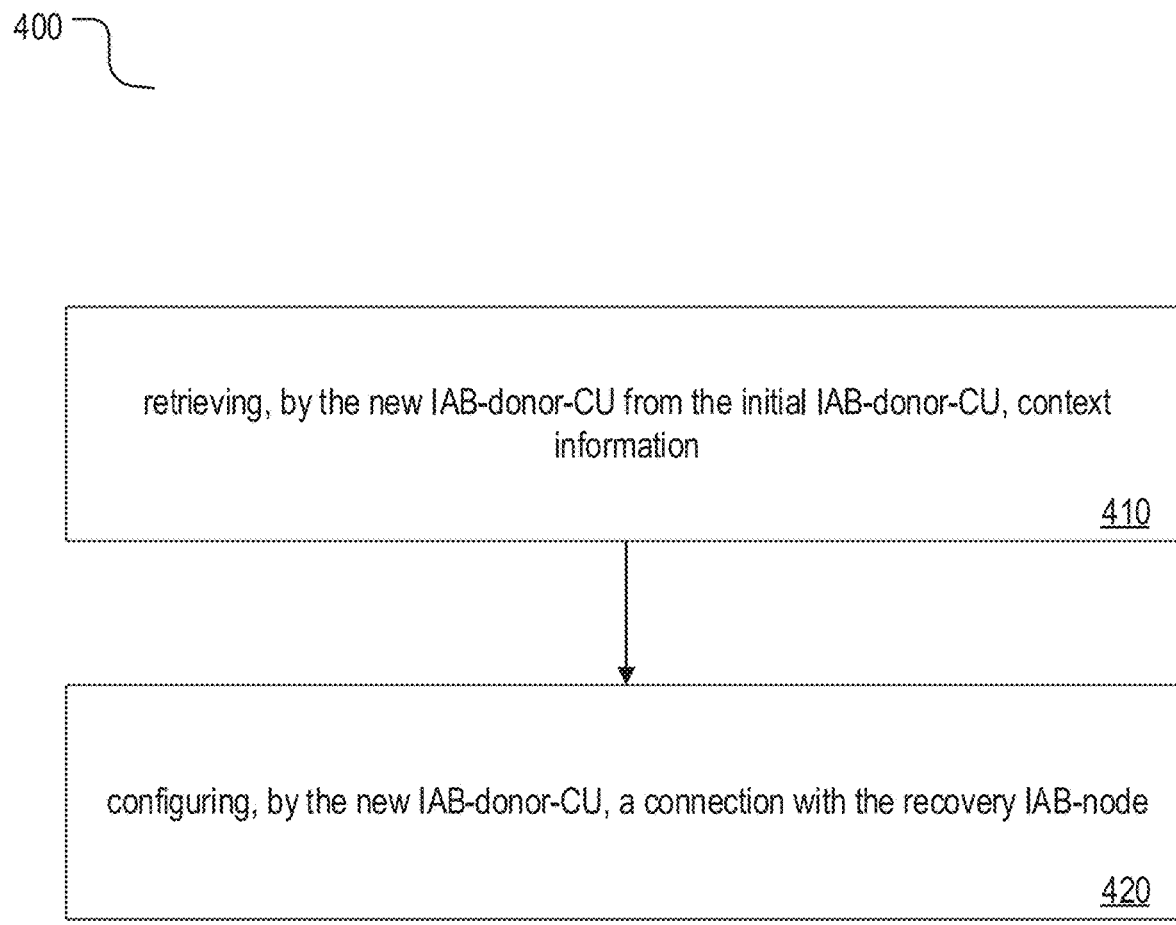
FIG. 4 shows a flow diagram of a method for wireless communication.

Referring to FIG. 4, the present disclosure describes an embodiment of a method 400 for recovering a recovery integrated access backhaul-node (IAB-node) for new radio (NR) from an initial IAB-donor-central unit (CU) to a new IAB-donor-CU. The method 400 may include a portion or all of the following steps: step 410: retrieving, by the new IAB-donor-CU from the initial IAB-donor-CU, context information; and step 420: configuring, by the new IAB-donor-CU, a connection with the recovery IAB-node.

In one implementation, the context information comprises at least one of the following: a recovery IAB-mobile terminal (IAB-MT) context; a recovery IAB-node distributed unit (IAB-DU) context; a context of at least one descendant IAB-node from the initial IAB-donor; or a context of at least one descendant user equipment (UE) from the initial IAB-donor.

In another implementation, the recovery IAB-MT context comprises at least one of the following: a NG-C UE associated signaling reference, a signaling transport network layer (TNL) association address at a source NG-C side, UE security capabilities, access stratum (AS) security information, a UE aggregate maximum bit rate, a protocol data unit (PDU) session resources to be setup list, a radio resource control (RRC) context, a backhaul adaption protocol (BAP) address, at least one internet protocol (IP) address of the IAB-MT, a gNB-DU F1AP ID, or an identity of a serving IAB node. Optionally, the NG-C UE associated signaling reference may include an AMF UE NGAP ID.

In another implementation, the recovery IAB-DU context comprises at least one of the following: a F1 interface context indicating application level data needed for the IAB-DU and an IAB-donor-CU to correctly interoperate on the F1 interface, a F1AP UE context in the IAB-DU for each UE of the IAB-DU, a BAP address of the IAB-DU, or at least one IP address of the IAB-DU.

Figure 5A:
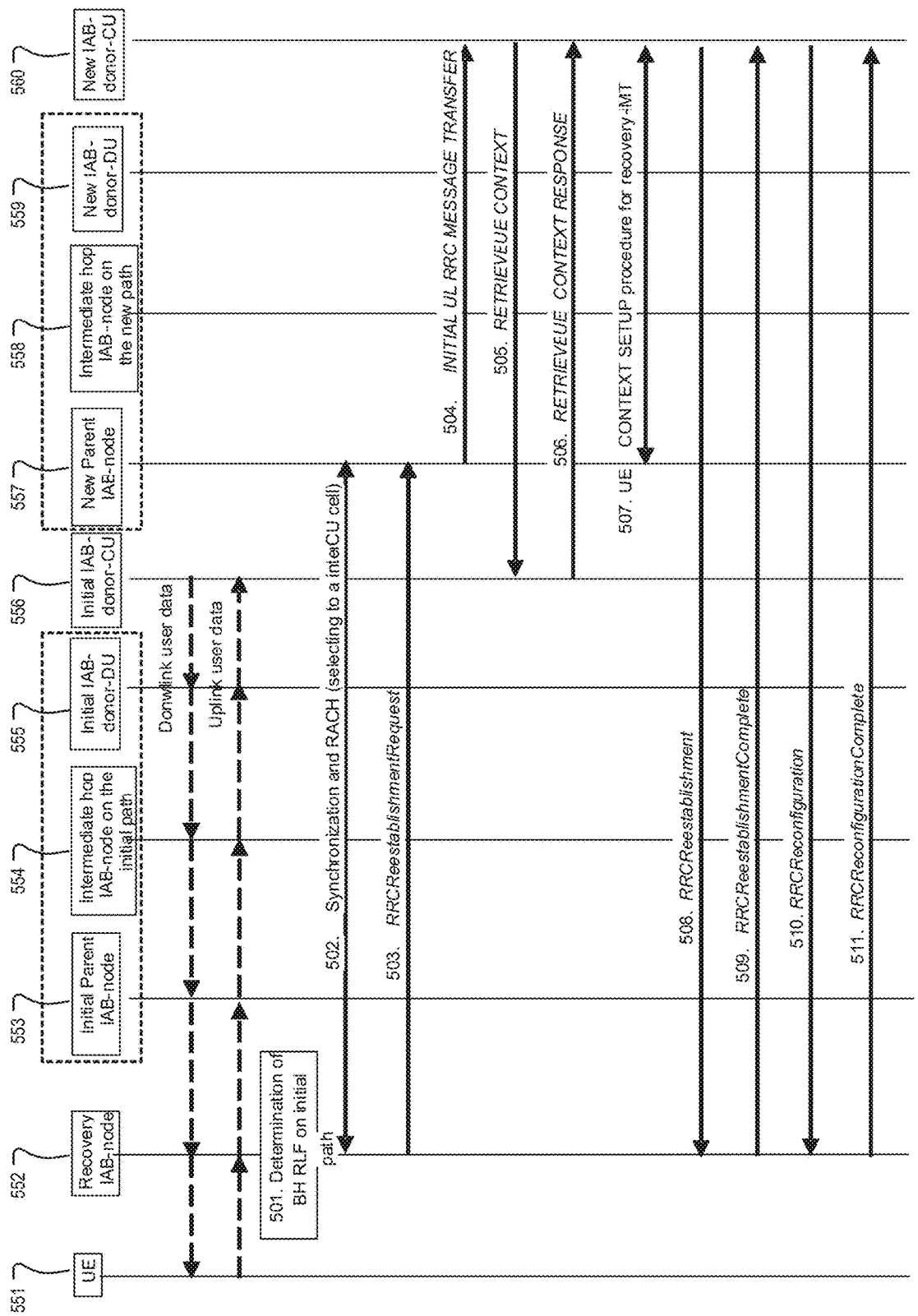
FIG. 5A shows an exemplary logic flow of a method for wireless communication.
Figure 5B:
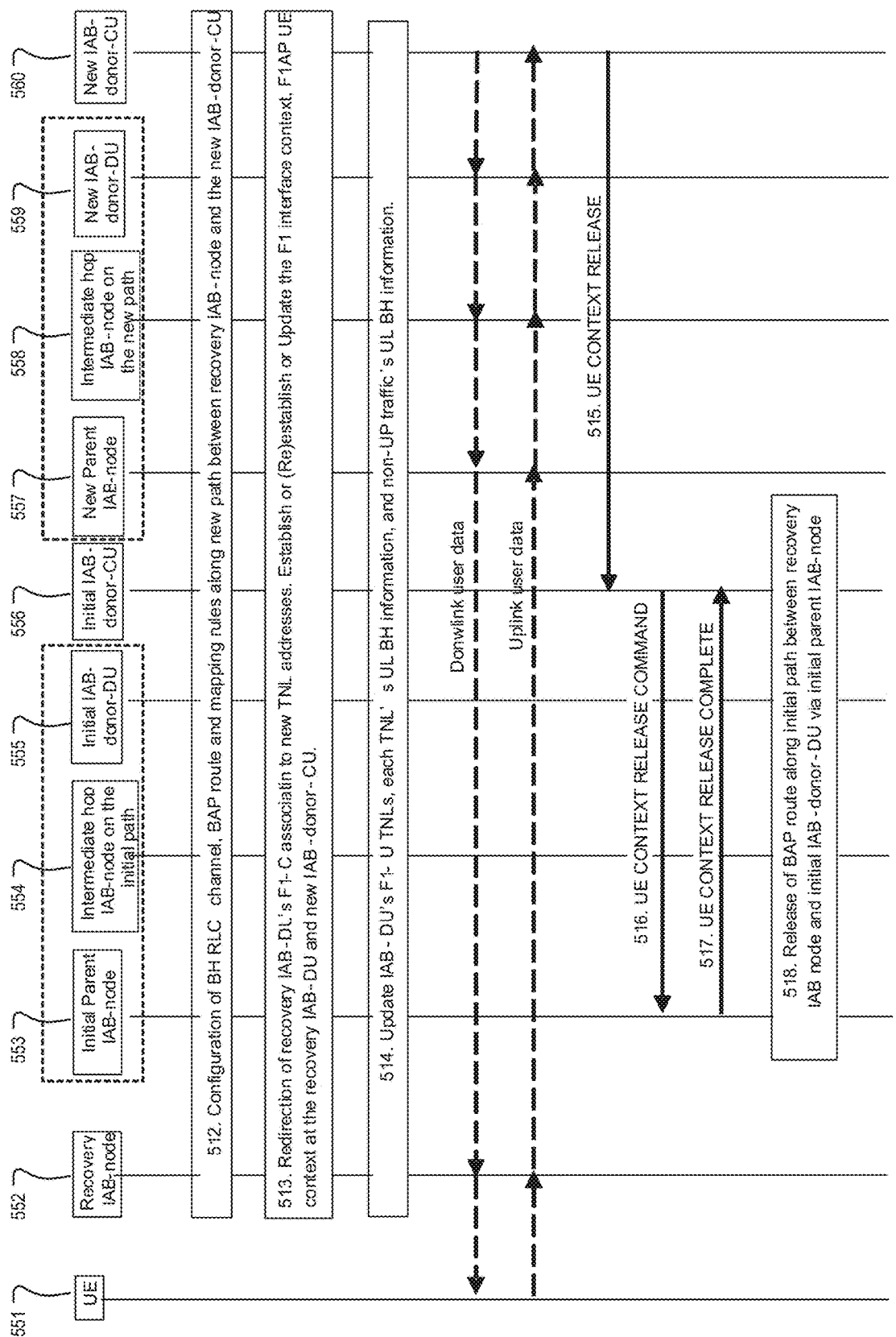
FIG. 5B shows an exemplary logic flow of the method for wireless communication in FIG. 5A.

In another implementation, the configuring, by the new IAB-donor-CU, the connection with the recovery IAB-node comprises at least one of the following: switching a F1-C connection to use a new TNL address of the recovery IAB-node and a new TNL address of the new IAB-donor-CU; establishing a SCTP connection to use the new TNL address of the recovery IAB-node and the new TNL address of the new IAB-donor-CU; establishing a F1 interface context between the new IAB-donor-CU and the recovery IAB-DU; re-establishing a F1 interface context between the new IAB-donor-CU and the recovery IAB-DU; updating a F1 interface context between the new IAB-donor-CU and the recovery IAB-DU; establishing a F1AP UE context between the new IAB-donor-CU and the recovery IAB-DU for at least one child IAB-node or at least one served UE of the recovery IAB-node; re-establishing a F1AP UE context between the new IAB-donor-CU and the recovery IAB-DU for at least one child IAB-node or at least one UE of the recovery IAB-node; or updating a F1AP UE context between the new IAB-donor-CU and the recovery IAB-DU for at least one child IAB-node or at least one UE of the recovery IAB-node;

FIGS. 5A and 5B show an example of an inter-CU backhaul (BH) RLF recovery procedure for an IAB-node in a standalone (SA) mode. The inter-CU backhaul RLF recovery procedure for IAB-nodes in SA mode may enable migration of an IAB-node to another parent node underneath a new IAB-donor-CU different from the initial IAB-donor-CU, when the IAB-MT declares a backhaul RLF.

The example in FIGS. 5A and 5B show that a recovery IAB-node 551 changes from its initial parent IAB-node 553 to a new parent IAB-node 557, where the new parent IAB-node is served by a new IAB-donor-CU 560 being different than an initial IAB-donor-CU 556 serving the initial parent IAB-node 553. In one implementation, the initial parent IAB-node 553 may connect to an initial IAB-donor-DU 555 via one or more intermediate hop IAB-node on the initial path 554. In another implementation, the new parent IAB-node 557 may connect to an new IAB-donor-DU 559 via one or more intermediate hop IAB-node on the new path 558. In another implementation, the recovery IAB-node may connect to one or more descendent IAB-node or UE, for example an UE 551.

In various implementations, the method 400 may optionally include a portion or all of the steps in FIGS. 5A and 5B, and the embodiments described in the present disclosure is examples of the various implementations, not limitations to the various implementations.

Referring to step 501 in FIG. 5A, the IAB-MT declares BH RLF for the MCG.

Referring to step 502 in FIG. 5A, the recovery IAB-MT performs synchronization and random access channel (RACH) to a new parent node, which is served by a new IAB-donor-CU.

Referring to steps 503 and 504 in FIG. 5A, the recovery IAB-MT sends RRCReestablishmentRequest message to the new IAB-donor-CU.

Referring to step 505 and 506 in FIG. 5A, the new IAB-donor-CU retrieves the context of the recovery IAB-MT. The new NG-RAN node need to retrieve the IAB-MT context, and optionally the collocated IAB-DU context, and optionally the context of descendant IAB-nodes/UEs from the old NG-RAN node.

Referring to step 507 in FIG. 5A, the new IAB-donor-CU initiates the UE CONTEXT SETUP procedure towards the new parent IAB-DU for establishing the UE-associated F1 logical association for the recovery IAB-MT.

Referring to step 508 in FIG. 5A, the new IAB-donor-CU sends RRCReestablishment message to the recovery IAB-MT through the new parent IAB-DU.

Referring to step 509 in FIG. 5A, the recovery IAB-MT sends RRCReestablishmentComplete message to the new IAB-donor-CU through the new parent IAB-DU.

Referring to steps 510 and 511 in FIG. 5A, the new IAB-donor-CU sends RRCReconfiguration message to the recovery IAB-MT through the new parent IAB-DU, and the recovery IAB-MT responds with RRCReconfigurationComplete message. In one implementation, the new IAB-donor-CU may provide one or more new transport network layer (TNL) address, which is anchored at the new IAB-donor-DU, to the IAB-MT via a radio resource control (RRC) signaling. In another implementation, the IAB-donor-CU may also provide a new default uplink (UL) mapping which includes a default BH RLC channel and a default backhaul adaption protocol (BAP) Routing ID for UL F1-C/non-F1 traffic on the new path, to the IAB-node undergoing recovery from RLF via RRCReconfiguration message in this procedure. In another implementation, the new IAB-donor-CU may provide a new BAP address to the recovery IAB-MT via RRCReconfiguration message.

Referring to step 512 in FIG. 5B, the IAB-donor-CU configures BH RLC channels and BAP-sublayer routing entries on the new path between the new parent IAB-node and new IAB-donor-DU as well as DL mappings on the new IAB-donor-DU for the recovery IAB-node's new path. In one implementation, these configurations may be performed at an earlier stage, e.g. immediately after step 517. In another implementation, the IAB-donor-CU may establish additional BH RLC channels to the recovery IAB-MT via RRC message.

Referring to step 513 in FIG. 5B, a portion or all of the following sub-steps may be performed. One sub-step includes that the F1-C connections are switched to use the recovery IAB-node's new TNL address and the new IAB-donor-CU's new TNL address. In another implementation, the stream control transmission protocol (SCTP) connection between the new IAB-donor-CU and the recovery IAB-node is established using the recovery IAB-node's new TNL address and the new IAB-donor-CU's new TNL address. Another sub-step includes that the new IAB-donor-CU and the recovery IAB-DU establish/re-establish/update F1 interface context. Another sub-step includes the new IAB-donor-CU and the recovery IAB-DU establish/re-establish/update F1AP UE context for the child IAB-nodes or UEs of the recovery IAB-node.

Referring to step 514 in FIG. 5B, the IAB-donor-CU updates the UL BH information associated to each general packet radio service (GPRS) tunneling protocol (GTP)-tunnel to migrating IAB-node. In one implementation, this step may also update UL fully qualified tunnel endpoint identifier (FTEID) and DL FTEID associated to each GTP-tunnel. All F1-U tunnels are switched to use the migrating IAB-node's new TNL address and the new IAB-donor-CU's new TNL address. In another implementation, the IAB-donor-CU may also update the UL BH information associated with non-UP traffic. Implementation must ensure the avoidance of potential race conditions, i.e. no conflicting configurations are concurrently performed using UE-associated and non-UE-associated procedures.

Referring to step 515 in FIG. 5B, the new IAB-donor-CU sends UE CONTEXT RELEASE message or information to indicate the initial IAB-donor-CU to release the resources for the recovery IAB-node.

Referring to step 516 in FIG. 5B, the initial IAB-donor-CU sends a UE CONTEXT RELEASE COMMAND message to the initial parent node IAB-DU.

Referring to step 517 in FIG. 5B, the initial parent node IAB-DU releases the recovery IAB-MT's context and responds to the IAB-donor-CU with a UE CONTEXT RELEASE COMPLETE message.

Referring to step 518 in FIG. 5B, the initial IAB-donor-CU releases BH RLC channels and BAP-sublayer routing entries on the initial path between the initial parent IAB-node and the initial IAB-donor-DU.

In another embodiment, descendant device, for example, one or more IAB-node/UE of the IAB-node undergoing recovery from RLF, may also need to perform recovery following the same mechanism as described in one or more steps in steps 501-515 in FIGS. 5A and 5B.

Figures 6, 7:
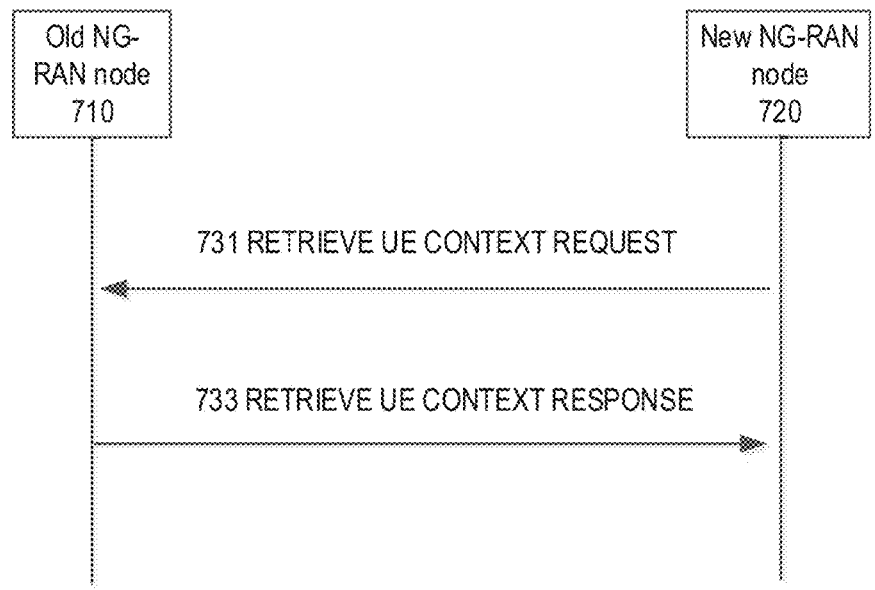
FIG. 6 shows a flow diagram of a method for wireless communication.
FIG. 7 shows a schematic diagram of a method for wireless communication.

Referring to FIG. 6, the present disclosure describes an embodiment of a method 600 for recovering a recovery integrated access backhaul-node (IAB-node) for new radio (NR) from an initial IAB-donor-central unit (CU) to a new IAB-donor-CU. The method 600 may include a portion or all of the following steps: step 610: sending, by the new IAB-donor-CU to the initial IAB-donor-CU, a request for retrieving user equipment (UE) context; and step 620: receiving, by the new IAB-donor-CU from the initial IAB-donor-CU, a response for retrieving UE context.

In one implementation, the request for retrieving UE context comprises at least one of the following information elements (IEs): a message type, a new next generation-radio access network (NG-RAN) node UE XnAP identification (ID) reference. an UE context ID, an integrity protection, a new cell identifier, or a radio resource control (RRC) resume cause.

In another implementation, the response for retrieving UE context comprises at least one of the following IEs: a message type, a new NG-RAN node UE XnAP ID reference, an old NG-RAN node UE XnAP ID reference, a globally unique access and mobility management function (AMF) ID (GUAMI), or UE context information—retrieve UE context response.

In another implementation, in response to the initial IAB-donor-CU identifies the UE context ID in the request for retrieving UE context, the response for retrieving UE context comprises at least one of the following information of an IAB-node identified by the UE context ID: IAB authorized information, an IAB-MT context, an IAB-DU context, backhaul and topology-related information, or IP address information.

In another implementation, the IAB authorized information indicates an IAB-node authorization status; the IAB-MT context indicates stored context information of the IAB-MT in the initial IAB-donor-CU; the IAB-DU context indicates stored context information of the IAB-DU in the initial IAB-donor-CU; the backhaul and topology-related information comprises one of the following: BH information, a BH RLC channel list, a BAP mapping configuration comprising at least one of the following: a BH routing information list, traffic mapping information, IP to layer2 traffic mapping information, or BAP layer BH RLC channel mapping information, a gNB-DU resource configuration comprising at least one of the following: an activated cells to be updated list, a child-node list, or a child-node cells list, or an identity of a parent IAB node; or the IP address information indicates at least one IP address used by the IAB-node.

In another implementation, the IAB-MT context comprises at least one of the following: a NG-C UE associated signaling reference, a signaling TNL association address at source NG-C side, UE security capabilities, AS security information, a UE aggregate maximum bit rate, a PDU session resources to be setup list, a RRC context, a BAP address, or at least one IP address of the IAB-MT.

In another implementation, the IAB-DU context comprises at least one of the following: a F1 interface context indicating application level data needed for the IAB-DU and the IAB-donor-CU to correctly interoperate on the F1 interface, a F1AP UE context in the IAB-DU for each UE of the IAB-DU, a BAP address of the IAB-DU, or at least one IP address of the IAB-DU.

In another implementation, the F1 interface context comprises at least one of the following information: a gNB-DU ID, a gNB-DU name, a gNB-DU served cells list, an activated cells list of the IAB-DU, a deactivated cells list of the IAB-DU, a cells status list of the IAB-DU, a barred cells list, a gNB-DU RRC version, a gNB-CU RRC version, a transport layer address information at a gNB-DU, a transport layer address information at a gNB-CU, a BAP address assigned to the IAB-node, a BAP address assigned to the initial IAB-donor-DU, or a uplink backhaul (BH) non-user plane (non-UP) traffic mapping.

In another implementation, the F1AP UE context for each UE comprises at least one of the following: a gNB-CU UE F1AP ID at the initial IAB-donor-CU, a gNB-DU UE F1AP ID, a secondary cell (SCell) list of the UE, a candidate special cell (SpCell) list of the UE, a discontinuous reception (DRX) cycle, a data radio bearer (DRB) list each item of which comprises a DRB ID, a local channel ID (LCID), a downlink (DL) UP TNL information list indicating a gNB-DU endpoint of a F1 transport bearer, a UL UP TNL information list indicating a gNB-CU endpoint of a F1 transport bearer, a QoS of a DRB, QoS flows mapped to the DRB, BH Information, a RLC mode, a UL configuration, a duplication activation, a DL PDCP SN length, a UL PDCP SN length, a cell-radio network temporary identifier (C-RNTI), a BH RLC channel list, or a BAP address configured for an corresponding child IAB-node.

In another implementation, the response for retrieve UE context comprises at least one of context information of at least one descendant IAB-node of the IAB-node identified by a UE context ID; and for each descendant IAB-node, the response for retrieve UE context comprises at least one of the following: an IAB authorized, an IAB-MT context, an IAB-DU context, backhaul and topology-related information, or IP address information.

In another implementation, the response for retrieve UE context comprises context information of at least one descendant UE of the IAB node identified by a UE context ID; and for each descendant UE, the response for retrieve UE context comprises at least one of the following: UE context information, an UE ID, wherein the UE ID comprises an UE context ID or another ID identifying the associated UE.

In another implementation, the UE context information comprises at least one of the following IEs: a NG-control plane interface (NG-C) UE associated signaling reference, a signaling transport network layer (TNL) association address at a source NG-C side, a UE security capabilities, access stratum (AS) security information, a UE aggregate maximum bit rate, a packet data unit (PDU) session resources to be setup list, or a RRC context.

In another implementation, the response for retrieve UE context comprises at least one of the following information of an IAB-node identified by the UE context ID: IAB authorized information, an IAB-MT context, an IAB-DU context, backhaul and topology-related information, or IP address information.

In another implementation, in response to the response for retrieve UE context comprising an IAB authorized IE, the new IAB-donor-CU considers the request for an IAB-node, wherein the IAB authorized IE provides information about an authorization status of the IAB-node. In another implementation, in response to the response for retrieve UE context comprising the IAB authorized IE, the new IAB-donor-CU stores received IAB authorization information in the UE context.

Referring to FIG. 7, an initial IAB-donor-CU may include an old NG-RAN node 710, and a new IAB-donor-CU may include a new NG-RAN node 720. Referring to step 731, the new NG-RAN node 720 initiates the procedure by sending the RETRIEVE CONTEXT REQUEST message to the old NG-RAN node. The RETRIEVE CONTEXT REQUEST message includes a Message Type, a New NG-RAN node UE XnAP ID reference, a UE Context ID, an Integrity protection, a New Cell Identifier, and optionally a RRC Resume Cause, an IAB-DU ID which identifies the IAB-DU collocated with the IAB-MT identified by UE Context ID.

Referring to step 733 in FIG. 7, if the old NG-RAN node is able to identify the UE context by means of the UE Context ID, and to successfully verify the UE by means of the integrity protection contained in the RETRIEVE CONTEXT REQUEST message, and decides to provide the UE context to the new NG-RAN node, it may respond to the new NG-RAN node with the RETRIEVE CONTEXT RESPONSE message. The RETRIEVE CONTEXT RESPONSE message includes the following information elements (IEs): a Message Type, a New NG-RAN node UE XnAP ID reference, an Old NG-RAN node UE XnAP ID reference, a globally unique AMF ID (GUAMI), UE Context Information—Retrieve UE Context Response.

In another implementation, the UE Context Information—Retrieve UE Context Response may include at least one of the following information elements (IEs): a NG-C UE associated Signaling reference, a Signaling TNL Association Address at source NG-C side, a UE Security Capabilities, an AS Security Information, a UE Aggregate Maximum Bit Rate, a PDU Session Resources To Be Setup List, or a RRC Context.

In another implementation, if the old NG-RAN node identifies that the UE Context ID is related to an IAB-node, the RETRIEVE CONTEXT RESPONSE message may further include at least one of the following information of the IAB node identified by the UE Context ID and the following information of the child/descendant UEs: an IAB Authorized, a UE Context Information, an IAB-MT Context, an IAB-DU Context, a Backhaul and topology-related information, an IP address information.

In another implementation, the one or more IE, which is comprises in the RETRIEVE CONTEXT REQUEST message and/or the RETRIEVE CONTEXT RESPONSE message, may include one or more of the following. One IE is a Message Type. Another IE is New NG-RAN node UE XnAP ID reference. Another IE is Old NG-RAN node UE XnAP ID reference.

Another IE is an IAB Authorized information that indicates the IAB node authorization status.

Another IE is an IAB-MT context that indicates the stored context information of the IAB-MT in old NG-RAN node. In one implementation, it may be a UE Context Information—Retrieve UE Context Response IE. In another implementation, it may include at least one of the following information: a NG-C UE associated Signaling reference, a Signaling TNL Association Address at source NG-C side, a UE Security Capabilities, an AS Security Information, a UE Aggregate Maximum Bit Rate, a PDU Session Resources To Be Setup List, a RRC Context, a BAP address, or one or more IP address.

Another IE is an IAB-DU Context that indicates the stored context information of the IAB-DU in old NG-RAN node. In one implementation, it may include at least one of the following information: the F1 interface context which indicates the application level data needed for the IAB-DU and the IAB-donor-CU to correctly interoperate on the F1 interface, the F1AP UE Context in the IAB-DU for each UE of the IAB-DU, the BAP address of the IAB-DU, the one or more IP address of the IAB-DU.

In one implementation, the F1 interface context includes at least one of the following information: a gNB-DU ID, a gNB-DU Name, a gNB-DU Served Cells List, an Activated Cells List of the IAB-DU, a Deactivated Cells List of the IAB-DU, a Cells Status List of the IAB-DU, a Barred Cells List, a gNB-DU RRC version, a gNB-CU RRC version, a Transport Layer Address Info at gNB-DU, a Transport Layer Address Info at gNB-CU, a BAP address assigned to the IAB-node, a BAP address assigned to the old IAB-donor-DU, Uplink BH Non-UP Traffic Mapping.

In another implementation, the F1 interface context includes at least one of the information listed in Table 1.

TABLE 1

Information elements in F1 interface context

| IE/Group Name | Semantics description |
|---|---|
| gNB-DU ID | |
| gNB-DU Name | |
| gNB-DU Served Cells List | List of cells configured in the gNB-DU |
| >gNB-DU Served Cells Item | |
| >>Served Cell Information | Information about the cells configured in the gNB-DU |
| >>gNB-DU System Information | RRC container with system information owned by gNB-DU |

TABLE 1-continued

Information elements in F1 interface context

| IE/Group Name | Semantics description |
| --- | --- |
| Dedicated SI Delivery Needed UE List | List of UEs unable to receive system information from broadcast |
| >Dedicated SI Delivery Needed UE Item | |
| >>gNB-CU UE F1AP ID | |
| >>NR CGI | |
| TNL Association List | |
| >TNL Association Item IEs | |
| >>TNL Association Transport Layer Address gNB-CU | CP Transport Layer Address of the gNB-CU. |
| >>TNL Association Transport Layer Address gNB-DU | CP Transport Layer Address of the gNB-DU. |
| >>TNL Association Usage | |
| Cells Status List | Complete list of active cells at gNB-DU |
| >Cells Status Item | |
| >>NR CGI | |
| >>Service Status | |
| Activated Cells List | |
| >Activated Cells List Item | |
| >>NR CGI | |
| >>NR PCI | Physical Cell ID |
| >>gNB-CU System Information | RRC container with system information owned by gNB-CU |
| >>Available PLMN List | |
| >>Extended Available PLMN List | This is included if Available PLMN List IE is included and if more than 6 Available PLMNs is to be signaled. |
| >>IAB Info IAB-donor-CU | IAB-related configuration sent by the IAB-donor-CU. |
| >>Available SNPN ID List | Indicates the available SNPN ID list. If this IE is included, the content of the Available PLMN List IE and Extended Available PLMN List IE if present in the Cells to be Activated List Item IE is ignored. |
| Deactivated Cells List | |
| >Deactivated Cells List Item | |
| >>NR CGI | |
| Barred Cells List | |
| >Barred Cells List Item | |
| >>NR CGI | |
| >>Cell Barred | |
| >>IAB Barred | |
| Protected E-UTRA Resources List | List of Protected E-UTRA Resources. |
| >Protected E-UTRA Resources List Item | |
| >>Spectrum Sharing Group ID | Indicates the E-UTRA cells involved in resource coordination with the NR cells affiliated with the same Spectrum Sharing Group ID. |
| >>E-UTRA Cells List | List of applicable E-UTRA cells. |
| >>>E-UTRA Cells List Item | |
| >>>>EUTRA Cell ID | Indicates the E-UTRAN Cell Global Identifier as defined in subclause 9.2.14 in TS 36.423 [9]. |
| >>>>Served E-UTRA Cell Information | |
| Neighbour Cell Information List | |
| >Neighbour Cell Information List Item | |
| >>NR CGI | |
| >>Intended TDD DL-UL Configuration | |
| gNB-DU RRC version | |
| Transport Layer Address Info | Transport Layer Address Info at gNB-DU |
| BAP Address | Indicates a BAP address assigned to the IAB-node |
| gNB-CU name | Name of old IAB-donor-CU |
| gNB-CU RRC version | |
| Transport Layer Address Info | Transport Layer Address Info at old gNB-CU |
| Uplink BH Non-UP Traffic Mapping | |
| BAP Address | Indicates a BAP address assigned to the old IAB-donor-DU |

In one implementation, the F1AP UE context for each UE includes at least one of the following information: a gNB-CU UE F1AP ID at old NG-RAN node, a gNB-DU UE F1AP ID, SCell List of the UE, a Candidate SpCell list of the UE, a DRX Cycle, a DRB List each item of which includes DRB ID, a LCID, a DL UP TNL Information List indicating the gNB-DU endpoint of the F1 transport bearer, a UL UP TNL Information List indicating the gNB-CU endpoint of the F1 transport bearer, a QoS of the DRB, a QoS Flows mapped to the DRB, a BH Information, a RLC Mode, a UL Configuration, a Duplication Activation, a DL PDCP SN length, a UL PDCP SN length, a C-RNTI, a BH RLC Channel List, a BAP address configured for the corresponding child IAB-node.

In another implementation, the F1AP UE context for each UE includes at least one of the information listed in Table 2.

TABLE 2

| Information elements in F1AP UE context | |
|---|---|
| IE/Group Name | Semantics description |
| Message Type | |
| gNB-CU UE F1AP ID | |
| gNB-DU UE F1AP ID | |
| SpCell ID | Special Cell as defined in TS 38.321 [16]. For handover case, this IE is considered as target cell. |
| ServCellIndex | |
| SpCell UL Configured | |
| CU to DU RRC Information | |
| Candidate SpCell List | |
| >Candidate SpCell Item IEs | |
| >>Candidate SpCell ID | Special Cell as defined in TS 38.321 [16] |
| DRX Cycle | |
| Resource Coordination Transfer Container | Includes the MeNB Resource Coordination Information IE as defined in subclause 9.2.116 of TS 36.423 [9] for EN-DC case or MR-DC Resource Coordination Information IE as defined in TS 38.423 [28] for NGEN-DC and NE-DC cases. |
| SCell List | |
| >SCell Setup Item IEs | |
| >>SCell ID | SCell Identifier in gNB |
| >>SCellIndex | |
| >>SCell UL Configured | |
| >>servingCellMO | |
| SRB List | |
| >SRB Item IEs | |
| >>SRB ID | |
| >>Duplication Indication | If included, it should be set to true. This IE is ignored if the Additional Duplication Indication IE is present. |
| >>Additional Duplication Indication | |
| DRB List | |
| >DRB Item IEs | |
| >>DRB ID | |
| >>LCID | LCID for the primary path or for the split secondary path for fallback to split bearer if PDCP duplication is applied. |
| >>DL UP TNL Information List | |
| >>>DL UP TNL Information Item IEs | |
| >>>>DL UP TNL Information | gNB-DU endpoint of the F1 transport bearer. For delivery of DL PDUs. |
| >>Additional PDCP Duplication TNL List | |
| >>>Additional PDCP Duplication TNL Items | |
| >>>>Additional PDCP Duplication UP TNL Information | gNB-DU endpoint of the F1 transport bearer. For delivery of DL PDUs. |
| >>CHOICE QoS Information | |
| >>>E-UTRAN QoS | Shall be used for EN-DC case to convey E-RAB Level QoS Parameters |
| >>>DRB Information | Shall be used for NG-RAN cases |
| >>>>DRB QoS | |
| >>>>S-NSSAI | |
| >>>>Notification Control | |
| >>>>Flows Mapped to DRB Item | |
| >>>>>QoS Flow Identifier | |
| >>>>>QoS Flow Level QoS Parameters | |
| >>>>>QoS Flow Mapping Indication | |
| >>>>>TSC Traffic Characteristics | Traffic pattern information associated with the QFI. Details in TS 23.501 [21]. |
| >>UL UP TNL Information to List | |
| >>>UL UP TNL Information Item IEs | |

TABLE 2-continued

Information elements in F1AP UE context

| IE/Group Name | Semantics description |
| --- | --- |
| >>>>UL UP TNL Information | gNB-CU endpoint of the F1 transport bearer. For delivery of UL PDUs. |
| >>>>BH Information | |
| >>RLC Mode | |
| >>UL Configuration | Information about UL usage in gNB-DU. |
| >>Duplication Activation | Information on the initial state of CA based UL PDCP duplication.<br>This IE is ignored if the RLC Duplication Information IE is present. |
| >>DC Based Duplication Configured | Indication on whether DC based PDCP duplication is configured or not. If included, it should be set to true. |
| >>DC Based Duplication Activation | Information on the initial state of DC basedUL PDCP duplication.<br>This IE is ignored if the RLC Duplication Information IE is present. |
| >>DL PDCP SN length | |
| >>UL PDCP SN length | |
| >>Additional PDCP Duplication TNL List | |
| >>>Additional PDCP Duplication TNL Items | |
| >>>>Additional PDCP Duplication UP TNL Information | gNB-CU endpoint of the F1 transport bearer. For delivery of UL PDUs. |
| >>RLC Duplication Information | |
| Inactivity Monitoring Request | |
| RAT-Frequency Priority Information | |
| RRC-Container | Includes the DL-DCCH-Message IE as defined in subclause 6.2 of TS 38.331 [8], encapsulated in a PDCP PDU. |
| Masked IMEISV | |
| Serving PLMN | Indicates the PLMN serving the UE. |
| gNB-DU UE Aggregate Maximum Bit Rate Uplink | The gNB-DU UE Aggregate Maximum Bit Rate Uplink is to be enforced by the gNB-DU. |
| RRC Delivery Status Request | Indicates whether RRC DELIVERY REPORT procedure is requested for the RRC message. |
| Resource Coordination Transfer Information | |
| servingCellMO | |
| RAN UE ID | |
| Trace Activation | |
| Additional RRM Policy Index | |
| BH RLC Channel List | |
| >BH RLC Channel Item IEs | |
| >>BH RLC CH ID | |
| >>CHOICE BH QoS Information | |
| >>>BH RLC CH QoS | Shall be used for SA case. |
| >>>E-UTRAN BH RLC CH QoS | Shall be used for EN-DC case. |
| >>>Control Plane Traffic Type | |
| >>RLC Mode | |
| >>BAP Control PDU Channel | |
| >>Traffic Mapping Information | |
| Configured BAP Address | The BAP address configured for the corresponding child IAB-node. |
| NR V2X Services Authorized | |
| LTE V2X Services Authorized | |
| NR UE Sidelink Aggregate Maximum Bit Rate | This IE applies only if the UE is authorized for NR V2X services. |
| LTE UE Sidelink Aggregate Maximum Bit Rate | This IE applies only if the UE is authorized for LTE V2X services. |
| PC5 Link Aggregated Bit Rate | Only applies for non-GBR and unicast QoS Flows. |
| SL DRB List | |
| >SL DRB Item IEs | |
| >>SL DRB ID | |
| >>SL DRB Information | |
| >>>SL DRB QoS | |
| >>>Flows Mapped to SL DRB Item | |
| >>>>PC5 QoS Flow Identifier | |
| >>RLC mode | |
| Conditional Inter-DU Mobility Information | |
| >CHO Trigger | |
| >Target gNB-DU UE F1AP ID | Allocated at the target gNB-DU |
| Management Based MDT PLMN List | |
| Serving NID | |
| DU To CU RRC Information | |

TABLE 2-continued

Information elements in F1AP UE context

| IE/Group Name | Semantics description |
| --- | --- |
| C-RNTI | C-RNTI allocated at the gNB-DU |
| Resource Coordination Transfer Container | Includes the SgNB Resource Coordination Information IE as defined in subclause 9.2.117 of TS 36.423 [9] for EN-DC case or MR-DC Resource Coordination Information IE as defined in TS 38.423 [28] for NGEN-DC and NE-DC cases. |

In one implementation, the backhaul and topology-related information may include BH Information, a BH RLC channel List, a BAP MAPPING CONFIGURATION (including a BH Routing Information List, a Traffic Mapping Information, an IP to layer2 Traffic Mapping Info, a BAP layer BH RLC channel Mapping Info), a GNB-DU RESOURCE CONFIGURATION (including an Activated Cells to Be Updated List, a Child-Node List, a Child-Node Cells List).

In another implementation, the BAP MAPPING CONFIGURATION includes at least one of the following information in Table 3.

TABLE 3

| Information elements in BAP MAPPING CONFIGURATION IE/Group Name |
| --- |
| BH Routing Information List<br>>BH Routing Information Added List Item<br>>>BAP Routing ID<br>>>Next-Hop BAP Address |

In another implementation, the GNB-DU RESOURCE CONFIGURATION includes at least one of the following information in Table 4.

TABLE 4

Information elements in GNB-DU RESOURCE CONFIGURATION

| | |
| --- | --- |
| Activated Cells List | List of activated cells served by the IAB-DU or the IAB-donor-DU whose resource configuration is updated |
| >Activated Cells List Item | |
| >>NR CGI | |
| >>CHOICE IAB-DU Cell Resource Configuration-Mode-Info | |
| >>>TDD | |
| >>>>TDD Info | |
| >>>>>gNB-DU Cell Resource Configuration-TDD | Contains TDD resource configuration of the gNB-DU's cell. |
| >>>FDD | |
| >>>>FDD Info | |
| >>>>>gNB-DU Cell Resource Configuration-FDD-UL | Contains FDD UL resource configuration of the gNB-DU's cell. |
| >>>>>gNB-DU Cell Resource Configuration-FDD-DL | Contains FDD DL resource configuration of the gNB-DU's cell. |
| Child-Nodes List | List of child IAB-nodes served by the IAB-DU or IAB-donor-DU. |
| >Child-Nodes List Item | |
| >>gNB-CU UE F1AP ID | Identifier of a descendant node IAB-MT at the IAB-donor-CU. |
| >>gNB-DU UE F1AP ID | Identifier of a child-node IAB-MT at an IAB-DU or IAB-donor-DU. |
| >>Child-Node Cells List | List of cells served by the child-node IAB-DU whose resource configuration is updated. |
| >>>Child-Node Cells List Item | |
| >>>>NR CGI | |
| >>>>CHOICE IAB-DU Cell Resource Configuration-Mode-Info | |
| >>>>>TDD | |
| >>>>>>TDD Info | |
| >>>>>>>gNB-DU Cell Resource Configuration-TDD | Contains TDD resource configuration of gNB-DU's cell. |
| >>>>>FDD | |
| >>>>>>FDD Info | |
| >>>>>>>gNB-DU Cell Resource Configuration-FDD-UL | Contains FDD UL resource configuration of gNB-DU's cell. |
| >>>>>>>gNB-DU Cell Resource Configuration-FDD-DL | Contains FDD DL resource configuration of gNB-DU's cell. |
| >>>>IAB STC Info | STC configuration of child-node IAB-DU's cell. |
| >>>>RACH Config Common | Corresponds to the rach-ConfigCommon as defined in subclause 6.3.2 of TS 38.331 [8]. |

TABLE 4-continued

Information elements in GNB-DU RESOURCE CONFIGURATION

| | |
|---|---|
| >>>>RACH Config Common IAB | Corresponds to the IAB-specific rach-ConfigCommon as defined in subclause 6.3.2 of TS 38.331 [8]. |
| >>>>CSI-RS Configuration | Corresponds to the NZP-CSI-RS-Resource as defined in subclause 6.3.2 of TS 38.331 [8]. |
| >>>>SR Configuration | Corresponds to the SchedulingRequestResourceConfig as defined in subclause 6.3.2 of TS 38.331 [8]. |
| >>>>PDCCH Configuration SIB1 | Corresponds to the PDCCH-ConfigSIB1 as defined in subclause 6.3.2 of TS 38.331 [8]. |
| >>>>SCS Common | Corresponds to the subCarrierSpacingCommon as defined in subclause 6.2.2 of TS 38.331 [8]. |
| >>>>Multiplexing Info | Contains information on multiplexing with cells configured for collocated IAB-MT. |

In another implementation, the IP address information indicates the one or more IP address used by the IAB node.

In another implementation, the RETRIEVE CONTEXT RESPONSE message may further include at least one of the context information of the descendant IAB nodes of the IAB node identified by the UE Context ID. For each descendant IAB node, the following context information is included in the RETRIEVE CONTEXT RESPONSE message: an IAB Authorized, an IAB-MT Context, an IAB-DU Context, a Backhaul and topology-related information, an IP address information.

In another implementation, the RETRIEVE CONTEXT RESPONSE message may further include the context information of the descendant UEs of the IAB node identified by the UE Context ID. For each descendant IAB node, the following context information is included in the RETRIEVE CONTEXT RESPONSE message: a UE Context information, a UE ID. The UE ID may be an UE Context ID or another ID identifying the associated UE.

In another implementation, if the IAB Authorized IE is included in the RETRIEVE CONTEXT REQUEST message, the new NG-RAN node may consider this message is for an IAB-node, and optionally store the received IAB Authorization information in the UE context.

In another implementation, the IE provides information about the authorization status of the IAB node in Table 5.

TABLE 5

Information elements for authorization status of IAB node

| IE/Group Name | Presence Range | IE type and reference | Semantics description |
|---|---|---|---|
| IAB Authorized | M | | ENUMERATED (authorized, not authorized, . . . ) | Indicates the IAB node authorization status. |

Figure 8:
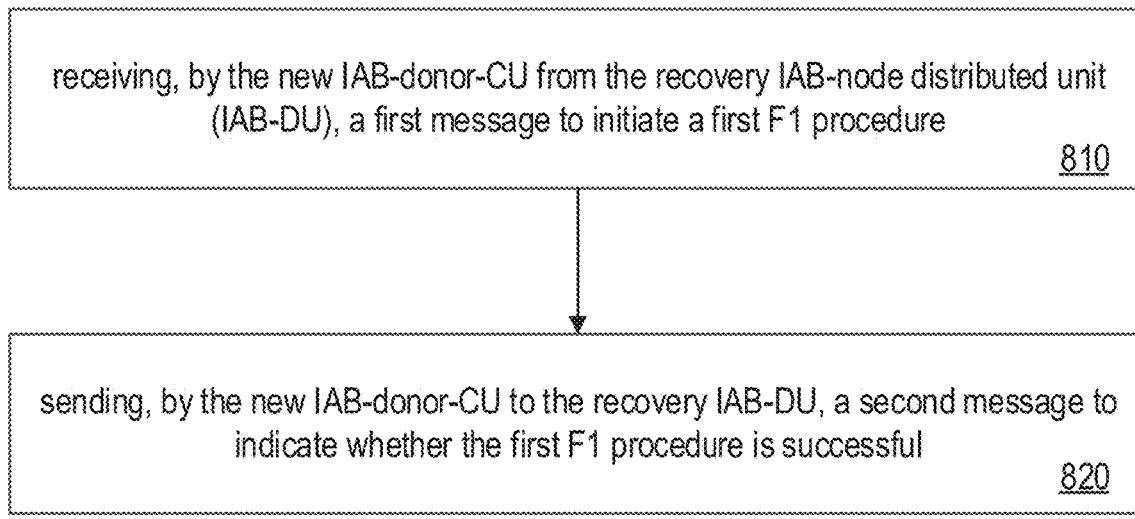
FIG. 8 shows a flow diagram of a method for wireless communication.

Referring to FIG. 8, the present disclosure describes an embodiment of a method 800 for recovering a recovery integrated access backhaul-node (IAB-node) for new radio (NR) from an initial IAB-donor-central unit (CU) to a new IAB-donor-CU. The method 800 may include a portion or all of the following steps: step 810: receiving, by the new IAB-donor-CU from the recovery IAB-node distributed unit (IAB-DU), a first message to initiate a first F1 procedure; and step 820: sending, by the new IAB-donor-CU to the recovery IAB-DU, a second message to indicate whether the first F1 procedure is successful. The new IAB-donor-CU comprises a gNB-CU and the recovery IAB-DU comprises a gNB-DU.

In one implementation, the first F1 procedure comprises a F1 connection re-establishment procedure re-establishing a F1 connection between the new IAB-donor-CU and the recovery IAB-DU.

In another implementation, the first F1 procedure comprises a F1 context update procedure updating a F1 interface context indicating an application level data needed for the gNB-DU and the gNB-CU to correctly interoperate on the F1 interface.

In another implementation, the first message comprises at least one of the following: a gNB-DU ID, a gNB-DU name, an old gNB-CU name, a BAP address, transport layer address information at a gNB-DU side, a gNB-DU RRC version, a gNB-DU TNL association to remove list, an old gNB-DU UE F1AP ID and new gNB-DU UE F1AP ID for each UE, a DL UP TNL address to update List, a message type, or a transaction ID.

In another implementation, when the second message indicates that the first F1 procedure is successful, the second message comprises at least one of the following: a gNB-DU ID, a gNB-CU name, a BAP address of the IAB-donor-DU, a gNB-CU RRC version, transport layer address information at a gNB-CU side, uplink BH non-UP traffic mapping, a gNB-CU TNL association to update list, an old gNB-CU UE F1AP ID and new gNB-CU UE F1AP ID for each UE, UL UP TNL information to update list, a message type, or a transaction ID.

In another implementation, when the second message indicates that the first F1 procedure is not successful, the second message comprises at least one of the following: an IE/Group name, a message type, a transaction ID, a cause, a time to wait, or a criticality diagnostics.

In another implementation, when the second message comprises the time to wait IE, the gNB-DU waits at least for an indicated time before reinitiating the first message towards the same gNB-CU.

Figure 9A:
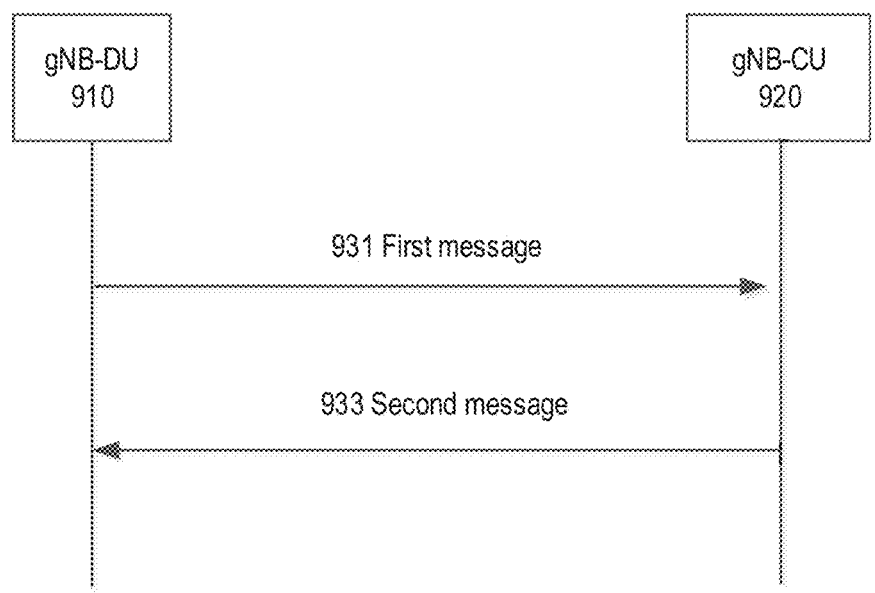
FIG. 9A shows a schematic diagram of a method for wireless communication.
Figures 9B, 10:
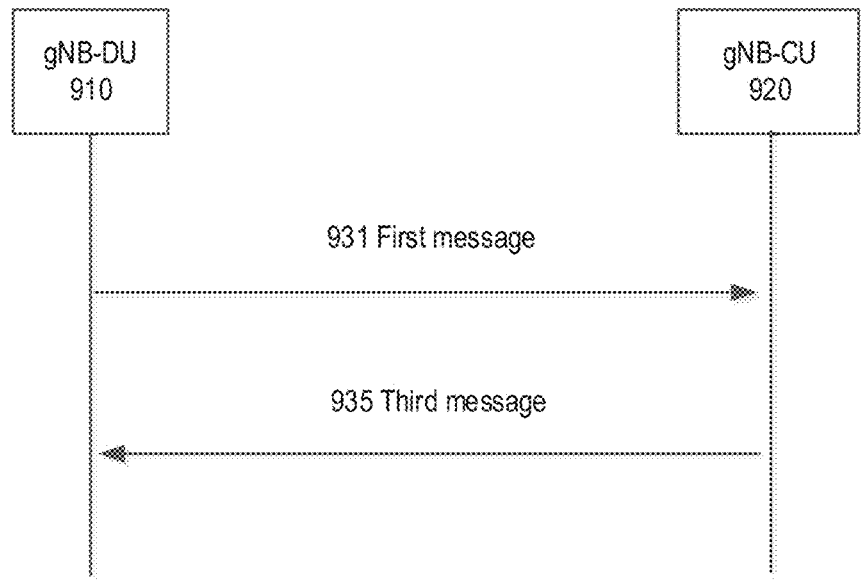
FIG. 9B shows a schematic diagram of a method for wireless communication.
FIG. 10 shows a flow diagram of a method for wireless communication.

Referring to FIGS. 9A and 9B, the new IAB-donor-CU may include a gNB-CU 920 and the recovery IAB-DU may include a gNB-DU 910. A First F1 procedure is to re-establish the F1 connection between the IAB-DU and the IAB-donor-CU. In one implementation, this procedure may update the F1 interface context which indicates the application level data needed for the gNB-DU and the gNB-CU to correctly interoperate on the F1 interface, and/or the F1AP UE context.

FIG. 9A shows an implementation of a successful operation and gNB-DU initiated First F1 procedure. FIG. 9B shows another implementation of a unsuccessful operation and gNB-DU initiated First F1 procedure.

In another implementation, this procedure may be a F1 Connection Reestablishment procedure, or a F1 Context Update procedure.

In another implementation, this procedure may be the first F1AP procedure triggered for the F1-C interface instance after a TNL association has become operational and optionally the collocated IAB-MT of the IAB-DU has succeeded in RRC Re-establishment to the IAB-donor-CU.

In another implementation, this procedure may use non-UE associated signaling.

Referring to step 931 in FIGS. 9A and/or 9B, this procedure may include a step that the IAB-DU initiates the First F1 procedure by sending a first message including the appropriate data to the IAB-donor-CU.

Referring to step 933 in FIG. 9A, this procedure may include a step that, when the first F1 procedure is successful, the gNB-CU sends a second message to the gNB-DU.

Referring to step 935 in FIG. 9B, this procedure may include a step that, when the first F1 procedure is not successful (i.e., a failure), the gNB-CU sends a third message to the gNB-DU. The third message is different from the second message.

In one implementation, the first message includes at least one of the following information.

Optionally and/or alternatively, the first message may include a gNB-DU ID which identifies the gNB-DU, it may be an old gNB-DU ID used before this procedure, or a new gNB-DU ID used after this procedure, or a pair of old gNB-DU ID and new gNB-DU ID.

Optionally and/or alternatively, the first message may include a gNB-DU name, which may be an old gNB-DU name used before this procedure, or a new gNB-DU name used after this procedure, or a pair of old gNB-DU name and new gNB-DU name.

Optionally and/or alternatively, the first message may include an old gNB-CU name, which is the gNB-CU name of the served IAB-donor-CU before this procedure.

Optionally and/or alternatively, the first message may include a BAP address, which may be an old BAP address used before this procedure, or a new BAP address used after this procedure, or a pair of old BAP address and new BAP address.

Optionally and/or alternatively, the first message may include a Transport Layer Address Info at gNB-DU side, which may be the Transport Layer Address Info used after this procedure, or a pair of old Transport Layer Address Info used before this procedure and new Transport Layer Address Info used after this procedure.

Optionally and/or alternatively, the first message may include a gNB-DU RRC version.

Optionally and/or alternatively, the first message may include a gNB-DU TNL Association To Remove List, each item of which includes at least one of: TNL Association Transport Layer Address of the gNB-DU and TNL Association Transport Layer Address of the gNB-CU.

Optionally and/or alternatively, the first message may include an Old gNB-DU UE F1AP ID and new gNB-DU UE F1AP ID for each UE. For each UE identified by the old gNB-DU UE F1AP ID before this procedure, the old gNB-DU UE F1AP ID is replaced by the new gNB-DU UE F1AP ID after this procedure.

Optionally and/or alternatively, the first message may include a DL UP TNL Address to Update List, each item of which includes at least one of: old DL UP Transport Layer Address of gNB-DU used for DL F1-U GTP tunnel before this procedure, and the corresponding new Transport Layer Address of gNB-DU used to replace the old one.

Optionally and/or alternatively, the first message may include a Message Type.

Optionally and/or alternatively, the first message may include a Transaction ID.

In one implementation as the step 933 in FIG. 9A, the IAB-donor-CU may respond with a second message including the appropriate data. The second message includes at least one of the following information.

Optionally and/or alternatively, the second message may include a gNB-DU ID, which is a gNB-DU name used after this procedure.

Optionally and/or alternatively, the second message may include a gNB-CU name, which is the gNB-CU name of the served IAB-donor-CU after this procedure.

Optionally and/or alternatively, the second message may include a BAP address of the IAB-donor-DU, which may be a BAP address of the served IAB-donor-DU after this procedure, or a pair of the old BAP address of the served IAB-donor-DU before this procedure and the new BAP address of the served IAB-donor-DU after this procedure.

Optionally and/or alternatively, the second message may include a gNB-CU RRC version.

Optionally and/or alternatively, the second message may include a Transport Layer Address Info at gNB-CU side, which may be the Transport Layer Address Info used after this procedure, or a pair of old Transport Layer Address Info used before this procedure and new Transport Layer Address Info used after this procedure.

Optionally and/or alternatively, the second message may include a Uplink BH Non-UP Traffic Mapping.

Optionally and/or alternatively, the second message may include a gNB-CU TNL Association To Update List, each item of which includes at least one of: TNL Association Transport Layer Address of gNB-CU and optionally TNL Association Usage.

Optionally and/or alternatively, the second message may include an Old gNB-CU UE F1AP ID and new gNB-CU UE F1AP ID for each UE. For each UE identified by the old gNB-CU UE F1AP ID before this procedure, the old gNB-CU UE F1AP ID is replaced by the new gNB-CU UE F1AP ID after this procedure.

Optionally and/or alternatively, the second message may include a UL UP TNL Information to Update List, each Item of which includes at least one of: UL UP TNL Information, New UL UP TNL Information, BH Information.

Optionally and/or alternatively, the second message may include a Message Type.

Optionally and/or alternatively, the second message may include a Transaction ID.

In another implementation as the step 935 in FIG. 9B, the IAB-donor-CU indicates the failure of the First F1 procedure to the IAB-DU by sending a third message. The third message includes at least one of the following information elements: an IE/Group Name, a Message Type, a Transaction ID, a Cause, a Time to wait, a Criticality Diagnostics.

In one implementation, if the third message includes the Time To Wait IE, the gNB-DU may wait at least for the indicated time before reinitiating the first message towards the same gNB-CU.

Referring to FIG. 10, the present disclosure describes an embodiment of a method 1000 for configuring a F1 connection between an integrated access backhaul-node (IAB-node) and an IAB-donor-CU. The method 1000 may include a portion or all of the following steps: step 1010: sending, by the IAB-donor-CU to the IAB-node distributed unit (IAB-DU), a first message to initiate a first F1 procedure; and step 1020: receiving, by the IAB-donor-CU from the IAB-DU, a second message to indicate whether the first F1 procedure is successful. The IAB-donor-CU comprises a gNB-CU and the IAB-DU comprises a gNB-DU.

In one implementation, the first F1 procedure comprises a F1 connection re-establishment procedure re-establishing a F1 connection between the IAB-donor-CU and the IAB-DU.

In another implementation, the first F1 procedure comprises a F1 context update procedure updating a F1 interface context indicating an application level data needed for the gNB-DU and the gNB-CU to correctly interoperate on the F1 interface.

In another implementation, the first message comprises at least one of the following: a gNB-DU ID, a gNB-CU name, a BAP address of the IAB-donor-DU, a gNB-CU RRC version, transport layer address information at a gNB-CU side, uplink BH non-UP traffic mapping, a gNB-CU TNL association to update list, an old gNB-CU UE F1AP ID and new gNB-CU UE F1AP ID for each UE, UL UP TNL information to update list, a message type, or a transaction ID.

In another implementation, when the second message indicates that the first F1 procedure is successful, the second message comprises at least one of the following: a gNB-DU ID, a gNB-DU name, an old gNB-CU name, a BAP address, transport layer address information at a gNB-DU side, a gNB-DU RRC version, a gNB-DU TNL association to remove list, an old gNB-DU UE F1AP ID and new gNB-DU UE F1AP ID for each UE, a DL UP TNL address to update List, a message type, or a transaction ID.

In another implementation, when the second message indicates that the first F1 procedure is not successful, the second message comprises at least one of the following: an IE/Group name, a message type, a transaction ID, a cause, a time to wait, or a criticality diagnostics.

In another implementation, when the second message comprises the time to wait IE, the gNB-DU waits at least for an indicated time before reinitiating the first message towards the same gNB-CU.

Figure 11A:
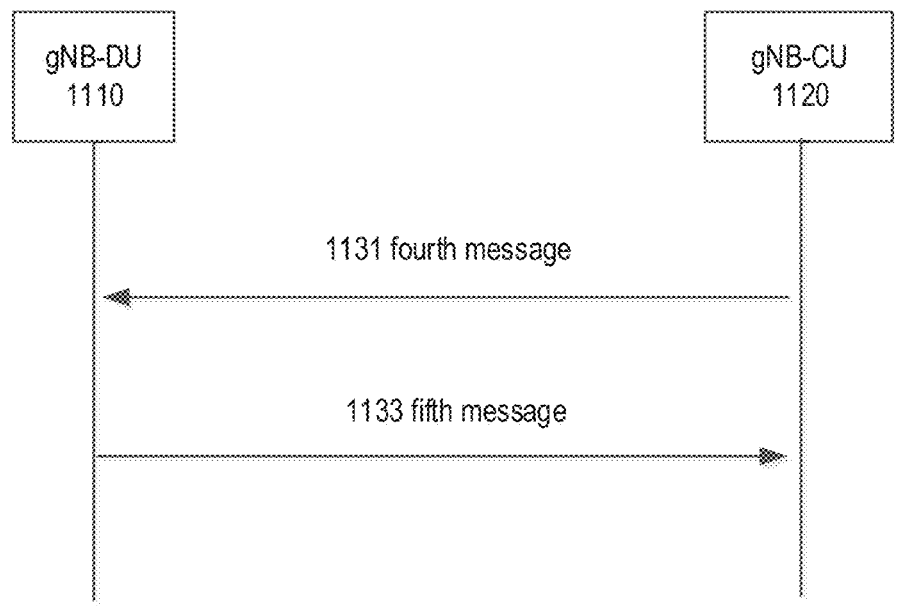
FIG. 11A shows a schematic diagram of a method for wireless communication.
Figure 11B:
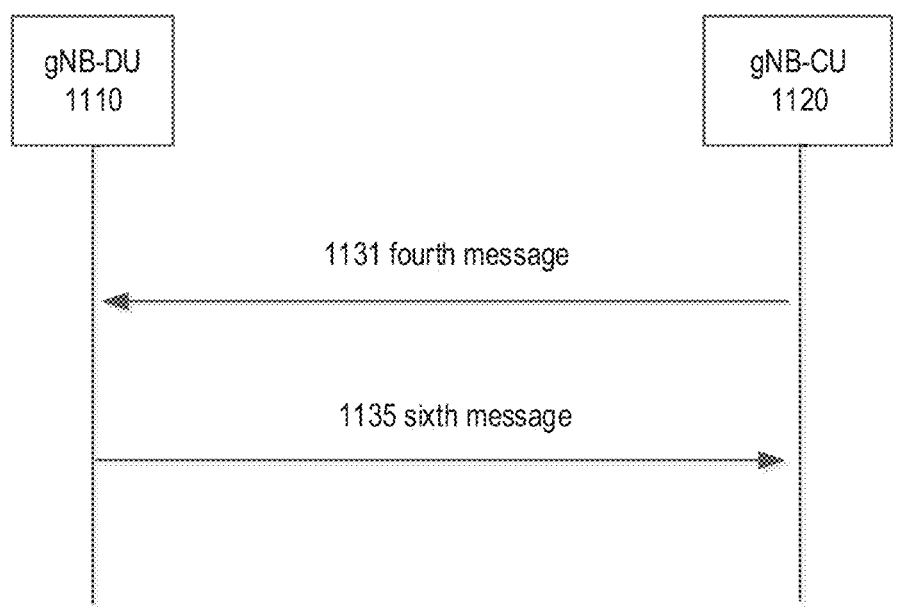
FIG. 11B shows a schematic diagram of a method for wireless communication.

Referring to FIGS. 11A and 11B, the IAB-donor-CU may include a gNB-CU 1120 and the IAB-DU may include a gNB-DU 1110. A First F1 procedure is to re-establish the F1 connection between the IAB-DU and the IAB-donor-CU. IAB-donor-CU and IAB-DU can be gNB-CU and gNB-DU, respectively. In one implementation, this procedure may update the F1 interface context which indicates the application level data needed for the gNB-DU and the gNB-CU to correctly interoperate on the F1 interface, and/or the F1AP UE context.

FIG. 11A shows an implementation of a successful operation and gNB-CU initiated First F1 procedure. FIG. 11B shows another implementation of an unsuccessful operation and gNB-CU initiated First F1 procedure.

In another implementation, this procedure can be a F1 Connection Reestablishment procedure, or a F1 Context Update procedure.

In another implementation, this procedure may be the first F1AP procedure triggered for the F1-C interface instance after a TNL association has become operational and optionally the collocated IAB-MT of the IAB-DU has succeeded in RRC Re-establishment to the IAB-donor-CU.

In another implementation, this procedure may use non-UE associated signaling.

Referring to step 1131 in FIGS. 11A and/or 11B, this procedure may include a step that the gNB-CU initiates the First F1 procedure by sending a fourth message including the appropriate data.

Referring to step 1133 in FIG. 11A, this procedure may include a step that, when the first F1 procedure is successful, the gNB-DU sends a fifth message to the gNB-CU.

Referring to step 1135 in FIG. 11B, this procedure may include a step that, when the first F1 procedure is not successful (i.e., a failure), the gNB-DU sends a sixth message to the gNB-CU. The sixth message is different from the fifth message.

In one implementation, the fourth message includes at least one of the following information.

Optionally and/or alternatively, the fourth message may include a gNB-DU ID, which is a gNB-DU name used after this procedure.

Optionally and/or alternatively, the fourth message may include a gNB-CU name, which is the gNB-CU name of the served IAB-donor-CU after this procedure.

Optionally and/or alternatively, the fourth message may include a BAP address of the IAB-donor-DU, which may be a BAP address of the served IAB-donor-DU after this procedure, or a pair of the old BAP address of the served IAB-donor-DU before this procedure and the new BAP address of the served IAB-donor-DU after this procedure.

Optionally and/or alternatively, the fourth message may include a gNB-CU RRC version.

Optionally and/or alternatively, the fourth message may include a Transport Layer Address Info at gNB-CU side, which may be the Transport Layer Address Info used after this procedure, or a pair of old Transport Layer Address Info used before this procedure and new Transport Layer Address Info used after this procedure.

Optionally and/or alternatively, the fourth message may include an Uplink BH Non-UP Traffic Mapping.

Optionally and/or alternatively, the fourth message may include a gNB-CU TNL Association To Update List, each item of which includes at least one of: TNL Association Transport Layer Address of gNB-CU and optionally TNL Association Usage.

Optionally and/or alternatively, the fourth message may include an Old gNB-CU UE F1AP ID and new gNB-CU UE F1AP ID for each UE. For each UE identified by the old gNB-CU UE F1 AP ID before this procedure, the old gNB-CU UE F1AP ID is replaced by the new gNB-CU UE F1AP ID after this procedure.

Optionally and/or alternatively, the fourth message may include a UL UP TNL Information to Update List, each Item of which includes at least one of: UL UP TNL Information, New UL UP TNL Information, BH Information.

Optionally and/or alternatively, the fourth message may include a Message Type.

Optionally and/or alternatively, the fourth message may include a Transaction ID.

In one implementation as the step 1133 in FIG. 11A, the gNB-DU may respond with a fifth message including the appropriate data to the IAB-donor-CU. The fifth message includes at least one of the following information.

Optionally and/or alternatively, the fifth message may include a gNB-DU ID identifies the gNB-DU, which may be an old gNB-DU ID used before this procedure, or a new gNB-DU ID used after this procedure, or a pair of old gNB-DU ID and new gNB-DU ID.

Optionally and/or alternatively, the fifth message may include a gNB-DU name, which may be an old gNB-DU name used before this procedure, or a new gNB-DU name used after this procedure, or a pair of old gNB-DU name and new gNB-DU name.

Optionally and/or alternatively, the fifth message may include an old gNB-CU name, which is the gNB-CU name of the served IAB-donor-CU before this procedure.

Optionally and/or alternatively, the fifth message may include a BAP address, which may be an old BAP address used before this procedure, or a new BAP address used after this procedure, or a pair of old BAP address and new BAP address.

Optionally and/or alternatively, the fifth message may include a Transport Layer Address Info at gNB-DU side, which may be the Transport Layer Address Info used after this procedure, or a pair of old Transport Layer Address Info used before this procedure and new Transport Layer Address Info used after this procedure.

Optionally and/or alternatively, the fifth message may include a gNB-DU RRC version.

Optionally and/or alternatively, the fifth message may include a gNB-DU TNL Association To Remove List, each item of which includes at least one of: TNL Association Transport Layer Address of the gNB-DU and TNL Association Transport Layer Address of the gNB-CU.

Optionally and/or alternatively, the fifth message may include an Old gNB-DU UE F1AP ID and new gNB-DU UE F1AP ID for each UE. For each UE identified by the old gNB-DU UE F1AP ID before this procedure, the old gNB-DU UE F1AP ID is replaced by the new gNB-DU UE F1AP ID after this procedure.

Optionally and/or alternatively, the fifth message may include a DL UP TNL Address to Update List, each item of which includes at least one of: old DL UP Transport Layer Address of gNB-DU used for DL F1-U GTP tunnel before this procedure, and the corresponding new Transport Layer Address of gNB-DU used to replace the old one.

Optionally and/or alternatively, the fifth message may include a Message Type.

Optionally and/or alternatively, the fifth message may include a Transaction ID.

In another implementation as the step 1135 in FIG. 11B, the gNB-DU indicates the failure of the First F1 procedure to the IAB-donor-CU by sending a sixth message.

The sixth message includes at least one of the following information elements: an IE/Group Name, a Message Type, a Transaction ID, a Cause, a Time to wait, a Criticality Diagnostics.

In one implementation, if the sixth message includes the Time To Wait IE, the gNB-CU may wait at least for the indicated time before reinitiating the first message towards the same gNB-DU.

The present disclosure describes an embodiment of a method for recovering a recovery integrated access backhaul-node (IAB-node) for new radio (NR) from an initial IAB-donor-central unit (CU) to a new IAB-donor-CU by sending an RRCReconfiguration from the new IAB-donor-CU to the recovery IAB-node. In one implementation, an IAB-donor-CU, for example, the new IAB-donor-CU, may send a first information to the IAB-MT via RRC signaling (e.g., RRCReconfiguration message). In another implementation, the first information includes the old gNB-DU ID and the new gNB-DU ID, optionally the old gNB-DU name and the new gNB-DU name. In another implementation, when the IAB-MT receives the first information, the collocated IAB-DU may use the new gNB-DU ID in replace of the old gNB-DU ID, and optionally use the new gNB-DU name in replace of the old gNB-DU name.

Referring to FIG. 12, the present disclosure describes an embodiment of a method 1200 for recovering a recovery integrated access backhaul-node (IAB-node) for new radio (NR) from an initial IAB-donor-central unit (CU) to a new IAB-donor-CU. The method 1200 may include a portion or all of the following steps: step 1210: sending, by the new IAB-donor-CU to the initial IAB-donor-CU, an IAB context retrieve related request message; and step 1220: receiving, by the new IAB-donor-CU from the initial IAB-donor-CU, an IAB context retrieve related response.

In one implementation, the IAB context retrieve related request message comprises a handover request acknowledgement (ACK) message.

In another implementation, the IAB context retrieve related request message comprises at least one of the following: a traffic mapping for a default path comprising at least one of the following: an prior-hop backhaul adaption protocol (BAP) address, an ingress backhaul (BH) radio link control (RLC) channel (CH) ID, a next-hop BAP address, or an egress BH RLC CH ID; a gNB-DU cell resource configuration configured by the new IAB-donor-CU; an IAB STC information configured by the new IAB-donor-CU; or at least one child IAB-DU cell configuration.

In another implementation, the at least one child IAB-DU cell configuration comprises at least one of the following: an old gNB-CU UE F1AP ID, a gNB-DU UE F1AP ID, an old NR cell global identifier (CGI), a gNB-DU cell resource configuration, IAB STC information, a random access channel (RACH) configuration, a channel state information-reference signal/scheduling request (CSI-RS/SR) configuration, a physical downlink control channel (PDCCH) configuration system information block (SIB), a subcarrier spacing (SCS) common, or multiplexing information.

In another implementation, the IAB context retrieve related response comprises at least one of the following: at least one identity of an IAB node or UE to migrate to the new IAB-donor-CU; gNB-DU system information; a gNB-DU cell resource configuration configured by the initial IAB-donor-CU; IAB STC information configured by the initial IAB-donor-CU; multiplexing information of an IAB node; or at least one child IAB-DU cell configuration.

In another implementation, the at least one child IAB-DU cell configuration comprises at least one of the following: an old gNB-CU UE F1AP ID, a gNB-DU UE F1AP ID, an old NR cell global identifier (CGI), a gNB-DU cell resource configuration, IAB STC information, a random access channel (RACH) configuration, a channel state information-reference signal/scheduling request (CSI-RS/SR) configuration, a physical downlink control channel (PDCCH) configuration system information block (SIB), a subcarrier spacing (SCS) common, or multiplexing information.

For one example, a new IAB-donor-CU may send IAB context retrieve related request message (e.g. Handover request ACK message) to an initial IAB-donor-CU, including at least one of the following: traffic mapping for default path: Prior-Hop BAP Address, Ingress BH RLC CH ID, Next-Hop BAP Address, Egress BH RLC CH ID; a gNB-DU Cell Resource Configuration configured by new IAB-donor-CU; an IAB STC Info configured by new IAB-donor-CU; a Child IAB-DU cell configurations, including an Old gNB-CU UE F1 AP ID, a gNB-DU UE F1AP ID, an old NR CGI, a gNB-DU Cell Resource Configuration, an IAB STC Info, a RACH configuration, a CSI-RS/SR Configuration, a PDCCH Configuration SIB1, a SCS Common, Multiplexing Info.

In one implementation, upon receiving the IAB context retrieve related request message, the initial IAB-donor-CU may send an IAB context retrieve related response to new IAB-donor-CU, including at least one of the following: identities of IAB node/UEs which need to migrate to new IAB-donor-CU; a gNB-DU System Information; a gNB-DU Cell Resource Configuration configured by Initial IAB-donor-CU; an IAB STC Info configured by Initial IAB-donor-CU; Multiplexing Info of IAB node; a Child IAB-DU cell configurations, including: an Old gNB-CU UE F1AP ID, a gNB-DU UE F1AP ID, an old NR CGI, a gNB-DU Cell Resource Configuration, an IAB STC Info, a RACH configuration, a CSI-RS/SR Configuration, a PDCCH Configuration SIB1, a SCS Common, a Multiplexing Info.

Referring to FIG. 13, the present disclosure describes an embodiment of a method 1300 for releasing resources for a recovery integrated access backhaul-node (IAB-node) from an initial IAB-donor-central unit (CU) to a new IAB-donor-CU. The method 1300 may include a portion or all of the following steps: step 1310: sending, by the new IAB-donor-CU to the initial IAB-donor-CU, a user equipment (UE) context release information to indicate the resources to be released; and step 1320: upon receiving the UE context release information, releasing, by the initial IAB-donor-CU, the resources for an IAB-node indicated in the UE context release information. Optionally, the UE context release information may include a UE context release message.

In one implementation, in response to a handover scenario, the new IAB-donor-CU comprises a target NG-RAN node and the initial IAB-donor-CU comprises a source NG-RAN node; in response to a dual connectivity scenario, the new IAB-donor-CU comprises a M-NG-RAN node and the initial IAB-donor-CU comprises a S-NG-RAN node; and in response to a UE context retrieval scenario, the new IAB-donor-CU comprises a new NG-RAN node and the initial IAB-donor-CU comprises an old NG-RAN node.

In another implementation, the UE context release message comprises at least one of the following: a message type, a source NG-RAN node UE XnAP ID, a target NG-RAN node UE XnAP ID, or an IAB node indication, wherein the IAB node indication indicates whether the UE context release message is related to an IAB-node.

In another implementation, in response to the handover configuration, the target NG-RAN node sends the UE context release message to the source NG-RAN node to inform the source NG-RAN node of handover success and trigger releasing the resources, so as to initiate the UE context release procedure; and upon receiving the UE context release message, the source NG-RAN node releases radio and control plane related resources associated to the UE context.

In another implementation, in response to the handover configuration, in response to the UE context release message being related to an IAB-MT or IAB-node according to the Source NG-RAN node UE XnAP ID, the source NG-RAN node releases at least one of the following resources: resources for associated IAB-MT/IAB-node, resources for associated IAB-DU, resources for descendant IAB-nodes/UEs of the associated IAB-node.

In another implementation, in response to the handover configuration, in response to the UE context release message comprising the IAB node indication, the source NG-RAN node considers the UE context release message being related to an IAB node.

In another implementation, in response to the UE context retrieval configuration, the new NG-RAN node sends the UE context release message to the old NG-RAN node to inform the old NG-RAN node of RRC connection reestablishment or resumption success and trigger releasing the resources, so as to initiate the UE context release procedure.

In another implementation, in response to the UE context retrieval configuration, in response to the UE context release message being related to an IAB-MT or IAB-node according to the Source NG-RAN node UE XnAP ID, the old NG-RAN node releases at least one of the following resources: resources for associated IAB-MT/IAB-node, resources for associated IAB-DU, resources for descendant IAB-nodes/UEs of the associated IAB-node.

In another implementation, in response to the UE context retrieval configuration, in response to the UE context release message comprising the IAB node indication, the old NG-RAN node considers the UE context release message being related to an IAB node.

In various embodiments, a pair of <first NG-RAN node, second NG-RAN node> may be referred as <target NG-RAN node, source NG-RAN node> in a handover scenario, <M-NG-RAN node, S-NG-RAN node> in a dual connectivity scenario, and/or <new NG-RAN node, old/initial NG-RAN node> in a UE Context Retrieval scenario.

Figure 14:
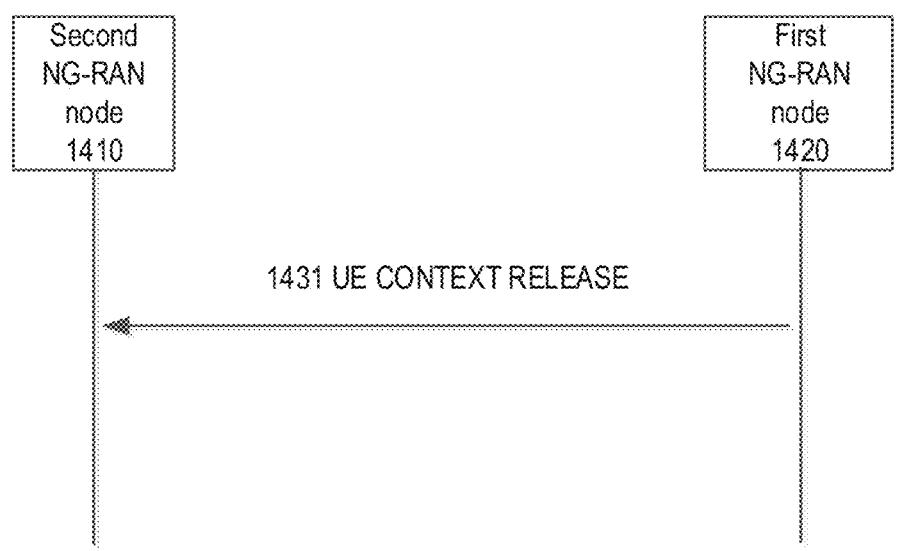
FIG. 14 shows a schematic diagram of a method for wireless communication.

Referring to FIG. 14, an initial IAB-donor-CU may include a second NG-RAN node 1410, and a new IAB-donor-CU may include a first NG-RAN node 1420.

Referring to step 1431, a UE CONTEXT RELEASE message is sent by the first NG-RAN node to the second NG-RAN node to indicate that resources can be released.

In one implementation, the UE CONTEXT RELEASE message includes a Message Type, a Source NG-RAN node UE XnAP ID, and a Target NG-RAN node UE XnAP ID. Optionally the UE CONTEXT RELEASE message includes IAB Node Indication. The IAB Node Indication indicates whether the message is related to an IAB-node.

In another implementation, the UE CONTEXT RELEASE message includes at least one of the following IEs in Table 6.

TABLE 6

Information elements in UE CONTEXT RELEASE message

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated for handover at the source NG-RAN node or for dual connectivity at the S-NG-RAN node. | YES | reject |
| Target NG-RAN node UE XnAP ID | M | | NG-RAN node UE XnAP ID 9.2.3.16 | Allocated for handover at the target NG- | YES | reject |

TABLE 6-continued

Information elements in UE CONTEXT RELEASE message

| IE/Group Name | Presence | Range | IE type and reference | Semantics description | Criticality | Assigned Criticality |
|---|---|---|---|---|---|---|
| IAB Node Indication | O | | ENUMERATED (true, . . . ) | RAN node or for dual connectivity at the M-NG-RAN node. Indication of an IAB node | YES | reject |

For one example in a handover scenario, the UE Context Release procedure may be initiated by the target NG-RAN node. By sending the UE CONTEXT RELEASE message, the target NG-RAN node informs the source NG-RAN node of a Handover success and triggers the release of resources.

In one implementation, upon reception of the UE CONTEXT RELEASE message, the source NG-RAN node may release radio and control plane related resources associated to the UE context. In another implementation, if data forwarding has been performed, the source NG-RAN node may continue forwarding of user plane data as long as packets are received at the source NG-RAN node.

In another implementation, if the old NG-RAN node finds that the message is related to an IAB-MT or IAB-node according to the Source NG-RAN node UE XnAP ID, the old NG-RAN node may release at least one of the following resources: the resources for the associated IAB-MT/IAB-node, the resources for the associated IAB-DU, the resources for the descendant IAB-nodes/UEs of the associated IAB-node.

In another implementation, if an IAB Node Indication is included in the UE CONTEXT RELEASE message, the old NG-RAN node may consider that the message is related to an IAB node.

For another example in a UE Context Retrieval scenario, the UE Context Release procedure may be initiated by the new NG-RAN node. By sending the UE CONTEXT RELEASE message, the new NG-RAN node informs the old NG-RAN node of RRC connection reestablishment success or RRC connection resumption success and triggers the release of resources.

In one implementation, if the old NG-RAN node finds that the message is related to an IAB-MT or IAB-node according to the Source NG-RAN node UE XnAP ID, the old NG-RAN node may release at least one of the following resources: the resources for the associated IAB-MT/IAB-node, the resources for the associated IAB-DU, the resources for the descendant IAB-nodes/UEs of the associated IAB-node. In another implementation, if an IAB Node Indication is included in the UE CONTEXT RELEASE message, the old NG-RAN node may consider that the message is related to an IAB node.

Referring to FIG. 15, the present disclosure describes an embodiment of a method 1500 for configuring at least one descendant device of a recovery integrated access backhaul-node (IAB-node) from an initial IAB-donor-central unit (CU) to a new IAB-donor-CU. The method 1500 may include a portion or all of the following steps: step 1510: sending, by the new IAB-donor-CU to the initial IAB-donor-CU, a message; step 1520: sending, by the initial IAB-donor-CU to the new IAB-donor-CU, a handover request message for requesting a handover procedure to at least one descendant device; step 1530: responding, by the new IAB-donor-CU to, a handover request acknowledge message; step 1540: sending, by the initial IAB-donor-CU to the at least one descendant device via the new IAB-donor-CU or new IAB-donor-DU, a radio resource control (RRC) message; and step 1550: sending, by the at least one descendant device to the new IAB-donor-CU, a response to the RRC message, indicating that a RRC connection of the at least one descendant device has been handover to the new IAB-donor-CU. In one implementation, optionally and/or alternatively, step 1540 may include sending, by the initial IAB-donor-CU to the at least one descendant device via the new IAB-donor-CU or new IAB-donor-DU, information; and step 1550 includes sending, by the at least one descendant device to the new IAB-donor-CU, a response to the information, indicating that a RRC connection of the at least one descendant device has been handover to the new IAB-donor-CU.

In one implementation, the message comprises at least one of the following: a new NG-RAN node UE XnAP ID reference identifying the IAB-node or UE association over the Xn interface within the gNB-CU, an old NG-RAN node UE XnAP ID reference identifying the IAB-node or UE association over the Xn interface within the gNB-CU, or an first indication indicating the IAB-node has succeeded in RLF recovery to the new IAB-donor-CU.

In another implementation, the at least one descendant device comprises one or more descendant or child IAB-node or one or more descendant or child UE.

For one example, to avoid the descendant IAB-nodes or UEs of recovery IAB node to perform RRC Reestablishment procedure due to the recovery IAB node migrates to a new IAB-donor-CU, the descendant IAB-nodes or UEs may take at least one of the following steps.

Referring to step 1510, the new IAB-donor-CU may transmit a seventh message to the old IAB-donor-CU, the seventh message includes New NG-RAN node UE XnAP ID reference which identifies the IAB-node (or UE) association over the Xn interface within the gNB-CU, Old NG-RAN node UE XnAP ID reference which identifies the IAB-node (or UE) association over the Xn interface within the gNB-CU, and an first indication which indicates the IAB-node has succeeded in RLF recovery to the new IAB-donor-CU.

Referring to step 1520, the old IAB-donor-CU sends HANDOVER REQUEST message to the new IAB-donor-CU for requesting handover the descendant/child IAB-nodes/UEs.

Referring to step 1530, the new IAB-donor-CU responses HANDOVER REQUEST ACKNOWLEDGE message to the old IAB-donor-CU to allow the corresponding descendant/child IAB-nodes/UEs to perform handover to the new IAB-donor-CU. The HANDOVER REQUEST ACKNOWLEDGE message may include the RRC transfer (i.e. RRC message 1) which is generated by the new IAB-donor-CU.

Referring to step 1540, the old IAB-donor-CU sends a RRC message (e.g., RRC message 2) to the corresponding descendant/child IAB-nodes/UEs via the new IAB-donor-CU/IAB-donor-DU, the RRC message 1 may be included in RRC message 2 as a RRC container.

Various embodiments for the RRC message 2 being transmitted from the old IAB-donor-CU to the corresponding descendant/child IAB-nodes/UEs of recovery IAB-node are described below in the present disclosure.

Referring to step 1550, the corresponding descendant/child IAB-nodes/UEs may send a response for RRC message 1 to the new IAB-donor-CU, which means that the RRC connection of the corresponding descendant/child IAB-nodes/UEs has been handover to the new IAB-donor-CU.

Referring to FIG. 16, the present disclosure describes an embodiment of a method 1600 for configuring at least one descendant device of a recovery integrated access backhaul-node (IAB-node) from an initial IAB-donor-central unit (CU) to a new IAB-donor-CU. The method 1600 may include a portion or all of the following steps: step 1610: sending, by the initial IAB-donor-CU to the at least one descendant device via the new IAB-donor-CU or new IAB-donor-DU, a radio resource control (RRC) message. The initial IAB-donor-CU comprises a first IAB-donor-CU serving the recovery IAB-node; and the new IAB-donor-CU comprises a second IAB-donor-CU.

In one implementation, the first IAB-donor-CU sends a second message to the second IAB-donor-CU; the second IAB-donor-CU sends a third message to the IAB-MT; and upon receiving a dedicatedInfoF1AP, the IAB-MT delivers the dedicatedInfoF1AP to the IAB-DU.

In another implementation, the second message comprises a UE-associated XnAP message; and the second message comprises at least one of the following: a new NG-RAN node UE XnAP ID reference identifying the UE association over the Xn interface within the gNB-CU, an old NG-RAN node UE XnAP ID reference identifying the UE association over the Xn interface within the gNB-CU, or a F1AP message for the IAB-node.

In another implementation, the third message comprises a RRC message comprising a DLInformationTransfer; and the third message comprises at least one of the following: a dedicatedInfoF1AP containing the F1AP message, an IAB-DU ID identifying the IAB-DU for receiving the dedicatedInfoF1AP.

Figure 17:
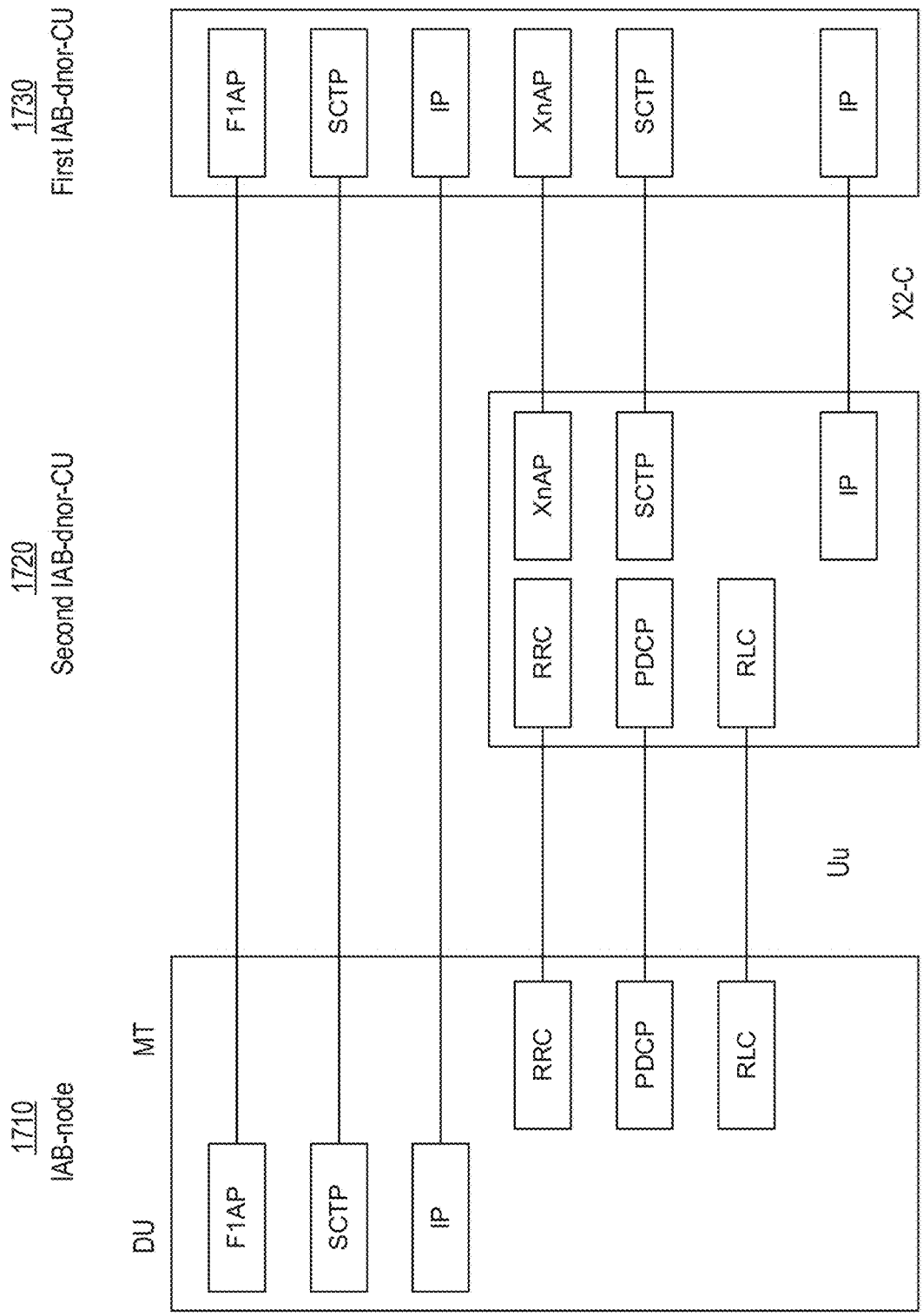
FIG. 17 shows a schematic diagram of a method for wireless communication.

For one example with a protocol stack for F1AP over RRC path as shown in FIG. 17, a first IAB-donor-CU 1730 may send an F1AP or F1-C message to an IAB-node 1710 though an XnAP association for the IAB-MT between the first IAB-donor-CU 1730 and a second IAB-donor-CU 1720, and the RRC link between the second IAB-donor-CU and the IAB-MT. The protocol for transmitting this kind of F1AP or F1-C message is shown in FIG. 17. In one implementation, the first IAB-donor-CU may be the initial IAB-donor-CU serving the IAB-node before the IAB-node occurs RLF, and the second IAB-donor-CU may be the new IAB-donor-CU which the IAB-node recovers to.

In another implementation, the at least one of the following steps are taken for transmitting F1AP/F1-C message between the IAB-node and the first IAB-donor-CU via the second IAB-donor-CU.

Optionally and/or alternatively, one step may include that the first IAB-donor-CU sends an eighth message to the second IAB-donor-CU. The eighth message can be a UE-associated XnAP message. The eighth message includes at least one of the following information: a New NG-RAN node UE XnAP ID reference which identifies the UE association over the Xn interface within the gNB-CU, an Old NG-RAN node UE XnAP ID reference which identifies the UE association over the Xn interface within the gNB-CU, and the F1AP message for the UE (i.e. IAB-node).

Optionally and/or alternatively, one step may include that the second IAB-donor-CU may send a ninth message to the IAB-MT. The ninth message can be a RRC message, e.g., DLInformationTransfer. The ninth message includes at least one of the following information: a dedicatedInfoF1AP which contains the F1AP message, or optionally an IAB-DU ID which identifies the IAB-DU for receiving the dedicatedInfoF1AP.

Optionally and/or alternatively, one step may include that upon receiving dedicatedInfoF1AP, the IAB-MT delivers it to the IAB-DU.

By performing one or more of the above steps, the IAB-DU may receive the F1AP message from the first IAB-donor-CU via the second IAB-donor-CU. If the F1AP message received by the IAB-DU includes RRC transfer container, the IAB-DU sends the RRC message to its child IAB-nodes or UEs. In other words, RRC message may be transmitted from an old IAB-donor-CU to the descendant/child IAB-nodes/UEs of recovery IAB-node.

Referring to FIG. 18, the present disclosure describes an embodiment of a method 1800 for configuring at least one descendant device of a recovery integrated access backhaul-node (IAB-node) from an initial IAB-donor-central unit (CU) to a new IAB-donor-CU. The method 1800 may include a portion or all of the following steps: step 1810: sending, by the initial IAB-donor-CU to the new IAB-donor-CU, a handover request message for requesting a handover procedure to at least one descendant device, wherein the at least one descendant device performs a conditional handover (CHO) to the new IAB-donor-CU based on the RRC message and a trigger condition; and step 1820: sending, by the at least one descendant device to the new IAB-donor-CU, a response to a RRC message, indicating that a RRC connection of the at least one descendant device has been handover to the new IAB-donor-CU.

In one implementation, the trigger condition comprises a condition of when a first timer expires, wherein the first timer starts upon receiving the RRC message. In another implementation, the trigger condition comprises a condition of receiving a second indication from a parent IAB-node; and the second indication indicates at least one of the following: that the parent IAB-node, IAB-MT, or IAB-DU has recovered or migrated to a new IAB-donor-CU, or that the parent IAB-node, IAB-MT, or IAB-DU will migrate or recover to a new IAB-donor-CU. In another implementation, the second indication is comprises at least one of the following: a system information block (SIB), a BAP control PDU, or a MAC CE.

In another implementation, the at least one descendant device receives a second information from a NG-RAN node, wherein the second information comprises at least one of the following information elements (IEs): a conditional configuration, an identify identifying the conditional configuration, an execution condition to be fulfilled in order to trigger an execution of a conditional configuration, or a first timer.

In another implementation, the at least one descendant device comprises at least one of the following: a UE or a IAB-mobile terminal (MT); the second information comprises a RRC signaling; the execution condition comprises a trigger to a handover procedure; and the conditional configuration in the second information comprises a RRC Reconfiguration message.

In another implementation, the execution condition comprises at least one of the following triggering events: upon receiving a second indication from parent IAB-node, or upon the first timer expires. In another implementation, the second indication indicates at least one of the following events: that a upstream or parent IAB-node, IAB-MT, or IAB-DU has recovered or migrated to the new IAB-donor-CU, that a parent or upstream IAB-node, IAB-MT, or IAB-DU is going to migrate or recover to the new IAB-donor-CU, or that the at least one descendant device is to execute the conditional configuration. In another implementation, the second indication is comprised in at least one of the following: a SIB, a BAP control PDU, or a MAC CE.

For one example of the embodiment, a RRC message (e.g., RRC message 1) may be used by the corresponding descendant/child IAB-nodes/UEs of recovery IAB-node for conditional handover (CHO) to the new IAB-donor-CU or the cell under the new IAB-donor-CU.

The trigger/condition for the corresponding descendant/child IAB-nodes/UEs to perform CHO is configured by the new/old IAB-donor-CU. In one implementation, the trigger/condition may be that a first timer expires, where the timer starts at receiving the RRC message.

In another implementation, the trigger may be that receiving a second indication from parent IAB-node. The second indication may indicate that the parent IAB-node/IAB-MT/IAB-DU has recovered/migrated to a new IAB-donor-CU, and/or the parent IAB-node/IAB-MT/IAB-DU is going to migrate/recover to a new IAB-donor-CU. The second indication may be included in a SIB, or a BAP control PDU, or a MAC CE.

For another example of the embodiment, an IAB-node/UE may receive a second information from a NG-RAN node, where the second information includes at least one of the following information elements: a conditional configuration, a identify identifying the conditional configuration, and an execution condition that needs to be fulfilled in order to trigger the execution of a conditional configuration, a first timer. In one implementation, the second information is a RRC signaling. In one implementation, the conditional configuration in the second information is a RRC Reconfiguration message.

In another implementation, the execution condition may include at least one of the following triggering events: upon receiving a second indication from parent IAB-node, upon a first timer expires where the timer.

In another implementation, the second indication may indicate that the upstream/parent IAB-node/IAB-MT/IAB-DU has recovered/migrated to a new IAB-donor-CU, and/or the parent/upstream IAB-node/IAB-MT/IAB-DU is going to migrate/recover to a new IAB-donor-CU. In another embodiment, the second indication may indicate the IAB node/UE to execute the conditional configuration. The second indication may be included in a SIB, or a BAP control PDU, or a MAC CE.

Referring to FIG. 19, the present disclosure describes an embodiment of a method 1900 for configuring at least one descendant device of a recovery integrated access backhaul-node (IAB-node) from an initial IAB-donor-central unit (CU) to a new IAB-donor-CU. The method 1900 may include a portion or all of the following steps: step 1910: sending, by a first IAB-node to a child device of the first IAB-node, an indication indicating a recovery event.

In one implementation, the child device of the first IAB-node comprises at least one of the following: a second IAB-node, a second IAB-MT, a second IAB-DU, or a user equipment (UE).

In another implementation, the recovery event comprises at least one of the following: that a upstream device of the first IAB-node has recovered or migrated to the new IAB-donor-CU, the upstream device is going to migrate or recover to the new IAB-donor-CU, an inter-CU backhaul radio link failure (RLF) recovery occurs, the child device needs to execute the conditional configuration, or the child device needs to perform a RRC reestablishment.

In another implementation, the upstream device comprises at least one of the following: a upstream IAB-node, a upstream IAB-MT, or a upstream IAB-DU.

In another implementation, upon receiving the third indication, the child device of the first IAB-node initiates a RRC reestablishment procedure.

In another implementation, upon receiving the third indication, the child device of the first IAB-node executes at least one of the following: any one of the stored or received conditional configurations, or any one of the conditional configurations whose execution condition/trigger is upon receiving a third indication.

In another implementation, the third indication is comprises in at least one of the following: a system information block (SIB), a BAP control PDU, a MAC CE, or a RRC signaling.

For one example of the embodiment, a first node may send a third indication to a second node, where the third indication indicates that the upstream/parent IAB-node/IAB-MT/IAB-DU has recovered/migrated to a new IAB-donor-CU, and/or the upstream/parent IAB-node/IAB-MT/IAB-DU is going to migrate/recover to a new IAB-donor-CU, or there is a inter-CU backhaul RLF recovery, or the second node needs to execute the conditional configuration, or the second node needs to perform RRC reestablishment.

The second node is an IAB-node/IAB-MT/IAB-DU or UE. In one implementation, the first node is the parent IAB-node of the second node. In another implementation, the first node is an IAB-donor-CU.

In another implementation, upon the second node receives the third indication, the second node stops transmitting at least one of the following traffic: data traffic, uplink F1-U traffic, downlink F1-U traffic, uplink non-F1 traffic, downlink non-F1 traffic. In another implementation, the second node may resume to transmit those traffic until the second node recovers to a new IAB-donor-CU, or the second node may resume to transmit those traffic until the second node receives a fourth indication.

In another implementation, the fourth indication is sent from the IAB-donor-CU or the parent of the second node to the second node to indicate the second node to resume to transmit those traffic.

Optionally and/or alternatively in another implementation, when the second node receives the third indication, the second node initiates RRC reestablishment procedure.

Optionally and/or alternatively in another implementation, when the second node receives the third indication, the second node initiates CHO to a cell, which is any one of all candidate CHO cells or any one of the candidate CHO cells whose execution condition/trigger is upon receiving a third indication.

Optionally and/or alternatively in another implementation, when the second node receives the third indication, the second node executes any one of the stored/received conditional configuration, or any one of the conditional configuration whose execution condition/trigger is upon receiving a third indication.

Optionally and/or alternatively in another implementation, when the second node receives the third indication, the second node initiates CHO to a cell, which is any one of all candidate CHO cells or any one of the candidate CHO cells whose execution condition/trigger is upon receiving a third indication.

In another implementation, the third indication may be included in a SIB, or a BAP control PDU, or a MAC CE, or a RRC signaling.

Referring to FIG. 20, the present disclosure describes an embodiment of a method 2000 for configuring at least one descendant device of a recovery integrated access backhaul-node (IAB-node) from an initial IAB-donor-central unit (CU) to a new IAB-donor-CU. The method 2000 may include a portion or all of the following steps: step 2010: sending, by the new IAB-donor-CU to a child device of the recovery IAB-node, a radio resource control (RRC) message; and step 2020: responding, by the child device of the recovery IAB-node, a RRC complete message.

In one implementation, the child device of the recovery IAB-node comprises at least one of the following: a child IAB-node of the recovery IAB-node or a child UE of the recovery IAB-node.

In another implementation, the new IAB-donor-CU sends the RRC message to the child device upon occurrence that an IAB-node, IAB-MT, or IAB-DU succeeds in recovering or migrating to a new IAB-donor-CU comprising at least one of the following: the IAB-MT and the new IAB-donor-CU finishes RRC reestablishment, or the IAB-DU finishes to migrates to the new IAB-donor-CU.

In another implementation, the RRC message comprises a RRC reestablishment message; the RRC complete message comprises a RRC reestablishment complete message; and the new IAB-donor-CU sends the RRC reestablishment message to the child device of the recovery IAB-node without receiving a RRC reestablishment request message from the child device.

In another implementation, the RRC message comprises a RRC reconfiguration message; the RRC complete message comprises a RRC reconfiguration complete message; and the new IAB-donor-CU sends the RRC reconfiguration message to the child device of the recovery IAB-node without performing a RRC reestablishment procedure for the child device.

For one example of the embodiment, upon an IAB-node/IAB-MT/IAB-DU succeeds in recovering/migrating to a new IAB-donor-CU (e.g., the IAB-MT and the new IAB-donor-CU finishes RRC reestablishment, or the IAB-DU finishes to migrates to the new IAB-donor-CU), RRC messages may be transmitted between the new IAB-donor-CU and the IAB-node's child IAB-nodes/UEs.

In one implementation, after an IAB-node/IAB-MT/IAB-DU recovers/migrates to a new IAB-donor-CU, steps 508-515 in FIGS. 5A and 5B may be performed for migrating the IAB-node's child IAB-nodes/UEs to the new IAB-donor-CU. Specifically in one implementation, the IAB-donor-CU may send a RRC reestablishment message to the IAB-node's child IAB-node/UE without receiving a RRC reestablishment request message from the IAB-node's child IAB-node/UE, the IAB-node's child IAB-node/UE may respond with a RRC reestablishment complete message.

In another implementation, after an IAB-node/IAB-MT/IAB-DU recovers/migrates to a new IAB-donor-CU, steps 510-515 in FIGS. 5A and 5B may be performed for migrating the IAB-node's child IAB-nodes/UEs to the new IAB-donor-CU. Specifically in one implementation, the IAB-donor-CU may send a RRC reconfiguration message to the IAB-node's child IAB-node/UE without performing RRC reestablishment procedure for the IAB-node's child IAB-node/UE, the IAB-node's child IAB-node/UE may respond with a RRC reestablishment complete message.

The present disclosure describes methods, apparatus, and computer-readable medium for wireless communication. The present disclosure addressed the issues with enhancing integrated access and backhaul (IAB) for new radio (NR). The methods, devices, and computer-readable medium described in the present disclosure may facilitate the performance of wireless communication by retrieving context information by a new IAB-donor-CU from an initial IAB-donor-CU and configuring a connection with the recovery IAB-node and/or one or more descendent/child IAB-node/UE, thus improving migration efficiency and overall wireless network performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
    sending, by a new integrated access backhaul-donor-central unit (IAB-donor-CU) to an initial IAB-donor-CU, a message, wherein the message comprises a new NG-RAN node UE XnAP ID, an old NG-RAN node UE XnAP ID, and a first indication,
    wherein:
        the new NG-RAN node UE XnAP ID indicates an IAB-node or UE association over an Xn interface within a gNB-CU corresponding to the new IAB-donor-CU;
        the old NG-RAN node UE XnAP ID indicates the IAB-node or UE association over the Xn interface within a gNB-CU corresponding to the old IAB-donor-CU; and
        the first indication indicates that the IAB-node or UE has succeeded in radio link failure (RLF) recovery to the new IAB-donor-CU; and
    receiving, by the new IAB-donor-CU from the initial IAB-donor-CU, a handover request message for requesting a handover procedure to at least one descendant device.

2. The method according to claim 1, further comprising:
responding, by the new IAB-donor-CU, a handover request acknowledge message.

3. The method according to claim 2, further comprising:
sending, by the initial IAB-donor-CU to the at least one descendant device via the new IAB-donor-CU or new IAB-donor-DU, a radio resource control (RRC) message; and
sending, by the at least one descendant device to the new IAB-donor-CU, a response to the RRC message, indicating that a RRC connection of the at least one descendant device has been handover to the new IAB-donor-CU.

4. The method according to claim 1, wherein:
the at least one descendant device comprises one or more descendant or child IAB-node or one or more descendant or child UE.

5. An apparatus comprising:
a memory storing instructions; and
a processor in communication with the memory, wherein, when the processor executes the instructions, the processor is configured to cause the apparatus to perform:
sending, to an initial integrated access backhaul-donor-central unit (IAB-donor-CU), a message, wherein the message comprises a new NG-RAN node UE XnAP ID, an old NG-RAN node UE XnAP ID, and a first indication,
wherein:
the new NG-RAN node UE XnAP ID indicates an IAB-node or UE association over an Xn interface within a gNB-CU corresponding to the new IAB-donor-CU;
the old NG-RAN node UE XnAP ID indicates the IAB-node or UE association over the Xn interface within a gNB-CU corresponding to the old IAB-donor-CU; and
the first indication indicates that the IAB-node or UE has succeeded in radio link failure (RLF) recovery to the new IAB-donor-CU; and
receiving, from the initial IAB-donor-CU, a handover request message for requesting a handover procedure to at least one descendant device.

6. The apparatus according to claim 5, wherein, when the processor executes the instructions, the processor is configured to further cause the apparatus to perform:
responding a handover request acknowledge message.

7. The apparatus according to claim 6, wherein, when the processor executes the instructions, the processor is configured to further cause the apparatus to perform:
transmitting, a radio resource control (RRC) message from the initial IAB-donor-CU to the at least one descendant device; and
receiving, from the at least one descendant device, a response to the RRC message, indicating that a RRC connection of the at least one descendant device has been handover to the apparatus.

8. The apparatus according to claim 5, wherein:
the at least one descendant device comprises one or more descendant or child IAB-node or one or more descendant or child UE.

9. A non-transitory computer-readable medium storing instructions, wherein, the instructions, when executed by a processor in an apparatus, are configured to cause the processor to perform:
sending, to an initial integrated access backhaul-donor-central unit (IAB-donor-CU), a message, wherein the message comprises a new NG-RAN node UE XnAP ID, an old NG-RAN node UE XnAP ID, and a first indication,
wherein:
the new NG-RAN node UE XnAP ID indicates an IAB-node or UE association over an Xn interface within a gNB-CU corresponding to the new IAB-donor-CU;
the old NG-RAN node UE XnAP ID indicates the IAB-node or UE association over the Xn interface within a gNB-CU corresponding to the old IAB-donor-CU; and
the first indication indicates that the IAB-node or UE has succeeded in radio link failure (RLF) recovery to the new IAB-donor-CU; and
receiving, from the initial IAB-donor-CU, a handover request message for requesting a handover procedure to at least one descendant device.

10. The non-transitory computer-readable medium according to claim 9, wherein the instructions, when executed by the processor, are configured to further cause the processor to perform:
responding a handover request acknowledge message.

11. The non-transitory computer-readable medium according to claim 10, wherein the instructions, when executed by the processor, are configured to further cause the processor to perform:
transmitting, a radio resource control (RRC) message from the initial IAB-donor-CU to the at least one descendant device; and
receiving, from the at least one descendant device, a response to the RRC message, indicating that a RRC connection of the at least one descendant device has been handover to the apparatus.

12. The non-transitory computer-readable medium according to claim 9, wherein:
the at least one descendant device comprises one or more descendant or child IAB-node or one or more descendant or child UE.

* * * * *